US009756408B2

(12) United States Patent
Ferretti et al.

(10) Patent No.: US 9,756,408 B2
(45) Date of Patent: Sep. 5, 2017

(54) INTEGRATED SOUND SYSTEM

(71) Applicant: FORD GLOBAL TECHNOLOGIES, LLC, Dearborn, MI (US)

(72) Inventors: Daniel Ferretti, Commerce Township, MI (US); Johnathan Andrew Line, Northville, MI (US); Marcos Silva Kondrad, Macomb Township, MI (US); Kevin Preuss, Berkley, MI (US); Keith Allen Godin, Dearborn, MI (US); David Frederick Lyons, New Haven, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/005,064

(22) Filed: Jan. 25, 2016

(65) Prior Publication Data
US 2017/0214988 A1    Jul. 27, 2017

(51) Int. Cl.
*H04R 1/02* (2006.01)
*H04R 1/28* (2006.01)
*B60N 2/48* (2006.01)

(52) U.S. Cl.
CPC ............... *H04R 1/025* (2013.01); *B60N 2/48* (2013.01); *H04R 1/023* (2013.01); *H04R 1/2811* (2013.01); *H04R 1/2834* (2013.01); *B60N 2002/4888* (2013.01); *H04R 2499/13* (2013.01)

(58) Field of Classification Search
CPC .. B60N 2/48; B60N 2002/4888; H04R 1/023; H04R 1/2811; H04R 1/2834; H04R 2499/13
See application file for complete search history.

(56) References Cited

U.S. PATENT DOCUMENTS

| 771,773 A | 10/1904 | Feely |
| 2,272,505 A | 2/1942 | Biggs |
| 2,661,050 A | 12/1953 | Felter |

(Continued)

FOREIGN PATENT DOCUMENTS

| DE | 102006061226 | 6/2008 |
| DE | 102012006074 | 11/2012 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — Brenda Bernardi
(74) *Attorney, Agent, or Firm* — Vichit Chea; Price Heneveld LLP

(57) ABSTRACT

A vehicle seating assembly comprises a seat having a lower seat and a seatback extending upwardly from the lower seat. The seatback comprises a forward facing surface, a rearward facing surface, a headrest mounted on an upper portion of the seatback and received within a headrest cup disposed on the forward facing surface of the seatback, a speaker assembly mounted in the headrest cup, and a resonance cavity formed proximate the headrest cup within which the speaker assembly is received.

19 Claims, 21 Drawing Sheets

(56) References Cited

U.S. PATENT DOCUMENTS

| | | | |
|---|---|---|---|
| 2,725,921 A | 12/1955 | Markin | |
| 2,958,369 A | 11/1960 | Pitts et al. | |
| 3,403,938 A | 10/1968 | Cramer et al. | |
| 3,512,605 A * | 5/1970 | McCorkle | B60N 2/4876 |
| | | | 181/141 |
| 3,550,953 A | 12/1970 | Neale | |
| 3,833,257 A | 9/1974 | Dove | |
| 3,880,462 A | 4/1975 | Mednick | |
| 3,929,374 A | 12/1975 | Hogan et al. | |
| 4,027,112 A * | 5/1977 | Heppner | A47C 7/38 |
| | | | 381/104 |
| 4,058,342 A | 11/1977 | Ettridge | |
| 4,205,877 A | 6/1980 | Ettridge | |
| 4,324,431 A | 4/1982 | Murphy et al. | |
| 4,334,709 A | 6/1982 | Akiyama et al. | |
| 4,353,595 A | 10/1982 | Kaneko et al. | |
| 4,440,443 A | 4/1984 | Nordskog | |
| 4,518,201 A | 5/1985 | Wahlmann et al. | |
| 4,541,669 A | 9/1985 | Goldner | |
| 2,609,221 A | 9/1986 | Bottcher | |
| 4,616,874 A | 10/1986 | Pietsch et al. | |
| 4,629,248 A | 12/1986 | Mawbey | |
| 4,638,884 A * | 1/1987 | Lee | H04R 5/023 |
| | | | 181/141 |
| 4,664,444 A | 5/1987 | Murphy | |
| 4,720,141 A | 1/1988 | Sakamoto et al. | |
| 4,752,982 A | 6/1988 | Jones et al. | |
| 4,767,155 A | 8/1988 | Kousaka et al. | |
| 4,915,447 A | 4/1990 | Shovar | |
| 5,104,189 A | 4/1992 | Hanai et al. | |
| 5,108,150 A | 4/1992 | Stas et al. | |
| 5,112,018 A | 5/1992 | Wahls | |
| 5,145,232 A | 9/1992 | Dal Monte | |
| 5,171,062 A | 12/1992 | Courtois | |
| 5,174,526 A | 12/1992 | Kanigowski | |
| 5,203,608 A | 4/1993 | Tame | |
| 5,364,164 A | 11/1994 | Kuranami | |
| 5,370,443 A | 12/1994 | Maruyama | |
| 5,518,294 A | 5/1996 | Ligon, Sr. et al. | |
| 5,560,681 A | 10/1996 | Dixon et al. | |
| 5,597,203 A | 1/1997 | Hubbard | |
| 5,647,635 A | 7/1997 | Aumond et al. | |
| 5,658,050 A | 8/1997 | Lorbiecki | |
| 5,690,387 A | 11/1997 | Sarti | |
| 5,692,802 A | 12/1997 | Aufrere et al. | |
| 5,755,493 A | 5/1998 | Kodaverdian | |
| 5,758,924 A | 6/1998 | Vishey | |
| 5,769,489 A | 6/1998 | Dellanno | |
| 5,823,620 A | 10/1998 | Le Caz | |
| 5,826,938 A | 10/1998 | Yanase et al. | |
| 5,836,648 A | 11/1998 | Karschin et al. | |
| 5,868,450 A | 2/1999 | Hashimoto | |
| 5,887,071 A * | 3/1999 | House | H04R 5/02 |
| | | | 381/332 |
| 5,902,014 A | 5/1999 | Dinkel et al. | |
| 5,913,568 A | 6/1999 | Brightbill et al. | |
| 5,951,039 A | 9/1999 | Severinski et al. | |
| 5,979,985 A | 11/1999 | Bauer et al. | |
| 6,024,406 A | 2/2000 | Charras et al. | |
| 6,062,642 A | 5/2000 | Sinnhuber et al. | |
| 6,079,781 A | 6/2000 | Tilley | |
| 6,109,690 A | 8/2000 | Wu et al. | |
| 6,145,925 A | 11/2000 | Eksin et al. | |
| 6,155,593 A | 12/2000 | Kimura et al. | |
| 6,179,379 B1 | 1/2001 | Andersson | |
| 6,189,966 B1 | 2/2001 | Faust et al. | |
| 6,196,627 B1 | 3/2001 | Faust et al. | |
| 6,206,466 B1 | 3/2001 | Komatsu | |
| 6,217,062 B1 | 4/2001 | Breyvogel et al. | |
| 6,220,661 B1 | 4/2001 | Peterson | |
| 6,224,150 B1 | 5/2001 | Eksin et al. | |
| 6,296,308 B1 | 10/2001 | Cosentino et al. | |
| 6,312,050 B1 | 11/2001 | Eklind | |
| 6,364,414 B1 | 4/2002 | Specht | |
| 6,375,269 B1 | 4/2002 | Maeda et al. | |
| 6,394,525 B1 | 5/2002 | Seibold | |
| 6,394,546 B1 | 5/2002 | Knoblock et al. | |
| 6,454,353 B1 | 9/2002 | Knaus | |
| 6,523,892 B1 | 2/2003 | Kage et al. | |
| 6,550,856 B1 | 4/2003 | Ganser et al. | |
| 6,565,150 B2 | 5/2003 | Fischer et al. | |
| 6,619,605 B2 | 9/2003 | Lambert | |
| 6,682,140 B2 | 1/2004 | Minuth et al. | |
| 6,695,406 B2 | 2/2004 | Plant | |
| 6,698,832 B2 | 3/2004 | Boudinot | |
| 6,736,452 B2 | 5/2004 | Aoki et al. | |
| 6,758,522 B2 | 7/2004 | Ligon, Sr. et al. | |
| 6,808,230 B2 | 10/2004 | Buss et al. | |
| 6,824,212 B2 | 11/2004 | Malsch et al. | |
| 6,848,742 B1 | 2/2005 | Aoki et al. | |
| 6,860,559 B2 | 3/2005 | Schuster, Sr. et al. | |
| 6,860,564 B2 | 3/2005 | Reed et al. | |
| 6,866,339 B2 | 3/2005 | Itoh | |
| 6,869,140 B2 | 3/2005 | White et al. | |
| 6,890,029 B2 | 5/2005 | Svantesson | |
| 6,908,151 B2 | 6/2005 | Meeker et al. | |
| 6,938,953 B2 | 9/2005 | Haland et al. | |
| 6,955,399 B2 | 10/2005 | Hong | |
| 6,962,392 B2 | 11/2005 | O'Connor | |
| 6,975,737 B2 * | 12/2005 | Hirao | H04R 5/023 |
| | | | 297/217.4 |
| 6,988,770 B2 | 1/2006 | Witchie | |
| 6,991,289 B2 | 1/2006 | House | |
| 6,997,473 B2 | 2/2006 | Tanase et al. | |
| 7,040,699 B2 | 5/2006 | Curran et al. | |
| 7,100,992 B2 | 9/2006 | Bargheer et al. | |
| 7,131,694 B1 | 11/2006 | Buffa | |
| 7,140,682 B2 | 11/2006 | Jaeger et al. | |
| 7,159,934 B2 | 1/2007 | Farquhar et al. | |
| 7,159,938 B1 | 1/2007 | Shiraishi | |
| 7,162,048 B2 * | 1/2007 | Shima | H04R 1/025 |
| | | | 381/334 |
| 7,185,950 B2 | 3/2007 | Pettersson et al. | |
| 7,213,876 B2 | 5/2007 | Stoewe | |
| 7,216,915 B2 | 5/2007 | Kammerer et al. | |
| 7,229,118 B2 | 6/2007 | Saberan et al. | |
| 7,261,371 B2 | 8/2007 | Thunissen et al. | |
| 7,344,189 B2 | 3/2008 | Reed et al. | |
| 7,350,859 B2 | 4/2008 | Klukowski | |
| 7,350,865 B2 | 4/2008 | Pearse | |
| 7,393,005 B2 | 7/2008 | Inazu et al. | |
| 7,425,034 B2 | 9/2008 | Bajic et al. | |
| 7,441,838 B2 | 10/2008 | Patwardhan | |
| 7,467,823 B2 | 12/2008 | Hartwich | |
| 7,478,869 B2 | 1/2009 | Lazanja et al. | |
| 7,481,489 B2 | 1/2009 | Demick | |
| 7,506,924 B2 | 3/2009 | Bargheer et al. | |
| 7,506,938 B2 | 3/2009 | Brennan et al. | |
| 7,523,888 B2 | 4/2009 | Ferry et al. | |
| 7,530,633 B2 | 5/2009 | Yokota et al. | |
| 7,543,888 B2 | 6/2009 | Kuno | |
| 7,578,552 B2 | 8/2009 | Bajic et al. | |
| 7,578,554 B2 | 8/2009 | Lee et al. | |
| 7,597,398 B2 | 10/2009 | Lindsay | |
| 7,614,693 B2 | 11/2009 | Ito | |
| 7,637,568 B2 | 12/2009 | Meeker et al. | |
| 7,641,281 B2 | 1/2010 | Grimm | |
| 7,668,329 B2 | 2/2010 | Matsuhashi | |
| 7,669,925 B2 | 3/2010 | Beck et al. | |
| 7,669,928 B2 | 3/2010 | Snyder | |
| 7,712,833 B2 | 5/2010 | Ueda | |
| 7,717,459 B2 | 5/2010 | Bostrom et al. | |
| 7,726,733 B2 | 6/2010 | Balser et al. | |
| 7,735,932 B2 | 6/2010 | Lazanja et al. | |
| 7,752,720 B2 | 7/2010 | Smith | |
| 7,753,451 B2 | 7/2010 | Maebert et al. | |
| 7,775,602 B2 | 8/2010 | Lazanja et al. | |
| 7,784,863 B2 | 8/2010 | Fallen | |
| 7,802,843 B2 | 9/2010 | Andersson et al. | |
| 7,819,470 B2 | 10/2010 | Humer et al. | |
| 7,823,971 B2 | 11/2010 | Humer et al. | |
| 7,845,729 B2 | 12/2010 | Yamada et al. | |
| 7,857,381 B2 | 12/2010 | Humer et al. | |
| 7,871,126 B2 | 1/2011 | Becker et al. | |

(56) References Cited

U.S. PATENT DOCUMENTS

| | | | |
|---|---|---|---|
| 7,891,701 B2 | 2/2011 | Tracht et al. | |
| 7,909,360 B2 | 3/2011 | Marriott et al. | |
| 7,931,294 B2 | 4/2011 | Okada et al. | |
| 7,931,330 B2 | 4/2011 | Itou et al. | |
| 7,946,649 B2 | 5/2011 | Galbreath et al. | |
| 7,963,553 B2 | 6/2011 | Huynh et al. | |
| 7,963,595 B2 | 6/2011 | Ito et al. | |
| 7,963,600 B2 | 6/2011 | Alexander et al. | |
| 7,966,835 B2 | 6/2011 | Petrovski | |
| 7,967,379 B2 | 6/2011 | Walters et al. | |
| 7,971,931 B2 | 7/2011 | Lazanja et al. | |
| 7,971,937 B2 | 7/2011 | Ishii et al. | |
| 8,011,726 B2 | 9/2011 | Omori et al. | |
| 8,016,355 B2 | 9/2011 | Ito et al. | |
| 8,029,055 B2 | 10/2011 | Hartlaub | |
| 8,038,222 B2 | 10/2011 | Lein et al. | |
| 8,075,053 B2 | 12/2011 | Tracht et al. | |
| 8,109,569 B2 | 2/2012 | Mitchell | |
| 8,123,246 B2 | 2/2012 | Gilbert et al. | |
| 8,128,167 B2 | 3/2012 | Zhong et al. | |
| 8,130,987 B2 * | 3/2012 | Kaneda | H04R 1/26 381/301 |
| 8,162,391 B2 | 4/2012 | Lazanja et al. | |
| 8,162,397 B2 | 4/2012 | Booth et al. | |
| 8,167,370 B2 | 5/2012 | Arakawa et al. | |
| 8,199,940 B2 * | 6/2012 | Yokota | H04R 5/04 381/1 |
| 8,210,568 B2 | 7/2012 | Ryden et al. | |
| 8,210,605 B2 | 7/2012 | Hough et al. | |
| 8,210,611 B2 | 7/2012 | Aldrich et al. | |
| 8,226,165 B2 | 7/2012 | Mizoi | |
| 8,297,708 B2 | 10/2012 | Mizobata et al. | |
| 8,342,607 B2 | 1/2013 | Hofmann et al. | |
| 8,408,646 B2 | 4/2013 | Harper et al. | |
| 8,516,842 B2 | 8/2013 | Petrovski | |
| 9,126,508 B2 | 9/2015 | Line et al. | |
| 2004/0195870 A1 | 10/2004 | Bohlender et al. | |
| 2005/0200166 A1 | 9/2005 | Noh | |
| 2006/0043777 A1 | 3/2006 | Friedman et al. | |
| 2007/0120401 A1 | 5/2007 | Minuth et al. | |
| 2007/0200398 A1 | 8/2007 | Wolas et al. | |
| 2008/0174159 A1 | 7/2008 | Kojima et al. | |
| 2008/0231099 A1 | 9/2008 | Szczepkowski et al. | |
| 2009/0039690 A1 | 2/2009 | Simon et al. | |
| 2009/0066122 A1 | 3/2009 | Minuth et al. | |
| 2009/0165263 A1 | 7/2009 | Smith | |
| 2009/0322124 A1 | 12/2009 | Barkow et al. | |
| 2010/0026066 A1 | 2/2010 | Graber et al. | |
| 2010/0038937 A1 | 2/2010 | Andersson et al. | |
| 2010/0140986 A1 | 6/2010 | Sawada | |
| 2010/0148550 A1 * | 6/2010 | Kidd | B60N 2/4876 297/217.4 |
| 2010/0171346 A1 | 7/2010 | Laframboise et al. | |
| 2010/0187881 A1 | 7/2010 | Fujita et al. | |
| 2010/0201167 A1 | 8/2010 | Wieclawski | |
| 2010/0231013 A1 | 9/2010 | Schlenker | |
| 2010/0259081 A1 | 10/2010 | Kuno | |
| 2010/0270840 A1 | 10/2010 | Tanaka et al. | |
| 2010/0301650 A1 | 12/2010 | Hong | |
| 2010/0320816 A1 | 12/2010 | Michalak | |
| 2011/0018498 A1 | 1/2011 | Soar | |
| 2011/0074185 A1 | 3/2011 | Nakaya et al. | |
| 2011/0095513 A1 | 4/2011 | Tracht et al. | |
| 2011/0095578 A1 | 4/2011 | Festag | |
| 2011/0109128 A1 | 5/2011 | Axakov et al. | |
| 2011/0109217 A1 | 5/2011 | Kang et al. | |
| 2011/0121624 A1 | 5/2011 | Brncick et al. | |
| 2011/0133525 A1 | 6/2011 | Oota | |
| 2011/0163574 A1 | 7/2011 | Tame et al. | |
| 2011/0163583 A1 | 7/2011 | Zhong et al. | |
| 2011/0186560 A1 | 8/2011 | Kennedy et al. | |
| 2011/0187174 A1 | 8/2011 | Tscherbner | |
| 2011/0235832 A1 * | 9/2011 | Riopel | A47G 9/1045 381/300 |
| 2011/0254335 A1 | 10/2011 | Pradier et al. | |
| 2011/0260506 A1 | 10/2011 | Kuno | |
| 2011/0272548 A1 | 11/2011 | Rudkowski et al. | |
| 2011/0272978 A1 | 11/2011 | Nitsuma | |
| 2011/0278885 A1 | 11/2011 | Procter et al. | |
| 2011/0278886 A1 | 11/2011 | Nitsuma | |
| 2011/0298261 A1 | 12/2011 | Holt et al. | |
| 2012/0032486 A1 | 2/2012 | Baker et al. | |
| 2012/0037754 A1 | 2/2012 | Kladde | |
| 2012/0063081 A1 | 3/2012 | Grunwald | |
| 2012/0080914 A1 | 4/2012 | Wang | |
| 2012/0091695 A1 | 4/2012 | Richez et al. | |
| 2012/0091766 A1 | 4/2012 | Yamaki et al. | |
| 2012/0091779 A1 | 4/2012 | Chang et al. | |
| 2012/0109468 A1 | 5/2012 | Baumann et al. | |
| 2012/0119551 A1 | 5/2012 | Brncick et al. | |
| 2012/0125959 A1 | 5/2012 | Kucera | |
| 2012/0127643 A1 | 5/2012 | Mitchell | |
| 2012/0129440 A1 | 5/2012 | Kitaguchi et al. | |
| 2012/0162891 A1 | 6/2012 | Tranchina et al. | |
| 2012/0175924 A1 | 7/2012 | Festag et al. | |
| 2012/0187729 A1 | 7/2012 | Fukawatase et al. | |
| 2012/0248833 A1 | 10/2012 | Hontz et al. | |
| 2012/0261974 A1 | 10/2012 | Yoshizawa et al. | |
| 2013/0076092 A1 | 3/2013 | Kulkarni et al. | |
| 2013/0285426 A1 | 10/2013 | Arant et al. | |
| 2014/0203606 A1 | 7/2014 | Line et al. | |
| 2014/0203610 A1 | 7/2014 | Line et al. | |
| 2014/0203617 A1 | 7/2014 | Line et al. | |
| 2014/0270322 A1 * | 9/2014 | Silverstein | H04R 1/023 381/391 |
| 2014/0300167 A1 | 10/2014 | Datta | |
| 2014/0334638 A1 * | 11/2014 | Barksdale | H04R 3/12 381/86 |
| 2014/0355783 A1 * | 12/2014 | Subat | B60N 2/4876 381/86 |
| 2014/0355793 A1 * | 12/2014 | Dublin | H04S 7/303 381/302 |
| 2015/0165935 A1 | 6/2015 | Sachs et al. | |
| 2015/0201260 A1 * | 7/2015 | Oswald | H04R 1/025 381/86 |
| 2016/0039320 A1 * | 2/2016 | Subat | B60N 2/4876 297/217.5 |
| 2016/0137106 A1 * | 5/2016 | Subat | B60N 2/44 381/389 |
| 2016/0159260 A1 * | 6/2016 | Subat | H04R 5/023 297/217.5 |
| 2016/0255430 A1 * | 9/2016 | Fujita | B60R 11/0217 |
| 2016/0257227 A1 * | 9/2016 | Takada | B60N 2/4876 |

FOREIGN PATENT DOCUMENTS

| | | |
|---|---|---|
| EP | 627339 | 12/1994 |
| EP | 0670240 | 2/1995 |
| EP | 754590 | 1/1997 |
| EP | 0594526 B1 | 3/1997 |
| EP | 926969 | 1/2002 |
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| EP | 2565070 | 3/2013 |
| JP | 2008189176 | 8/2008 |
| JP | 201178557 | 4/2011 |
| JP | 2011098588 | 5/2011 |
| JP | 2011251573 | 12/2011 |
| KR | 1020080066428 | 7/2008 |
| KR | 1020110051692 | 5/2011 |
| KR | 101180702 | 9/2012 |
| WO | 9511818 | 5/1995 |
| WO | 9958022 | 11/1999 |
| WO | 2006131189 | 12/2006 |
| WO | 2007028015 | 8/2007 |
| WO | 2008019981 | 2/2008 |
| WO | 2008073285 | 6/2008 |

(56) References Cited

FOREIGN PATENT DOCUMENTS

| WO | 2010096307 | 8/2010 |
|---|---|---|
| WO | 2011021952 | 2/2011 |
| WO | 2012008904 | 1/2012 |

OTHER PUBLICATIONS

"Thigh Support for Tall Drivers," http://cars.about.com/od/infiniti/ig/2009-Inifiniti-G37-Coupe-pics/2008-G37-cpe-thigh-support.htm (1 page).

Mladenov, "Opel Insignia Receives Seal of Approval for Ergonomic Seats," published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

ecoustics.com, "Cineak Motorized Articulating Headrest Preview," http://www.ecoustics.com/ah/reviews/furniture/accessories/cineak-motorized-headres, Oct. 9, 2012 (3 pages).

"'Performance' Car Seat Eliminates Steel," published in Plastics News—Indian Edition Plastics & Polymer News, http://www.plasticsinformart.com/performance-car-seat-eliminates-steel/ Jan. 2012 (3 pages).

"Frankfurt 2009 Trend—Light and Layered," by Hannah Macmurray, published in GreeenCarDesign, http://www.greencarddesign.com/site/trends/00138-frankfurt-2009-trend-light-and-layered, Sep. 2009 (9 pages).

General Motors LLC, "2013 Chevrolet Spark Owner Manual," copyright 2012, 356 pages.

"Imola Pro-Fit," Cobra (http://cobra.subseports.com/products/cat/seats/brand/Cobra/prodID/656), date uknown, 2 pages.

\* cited by examiner

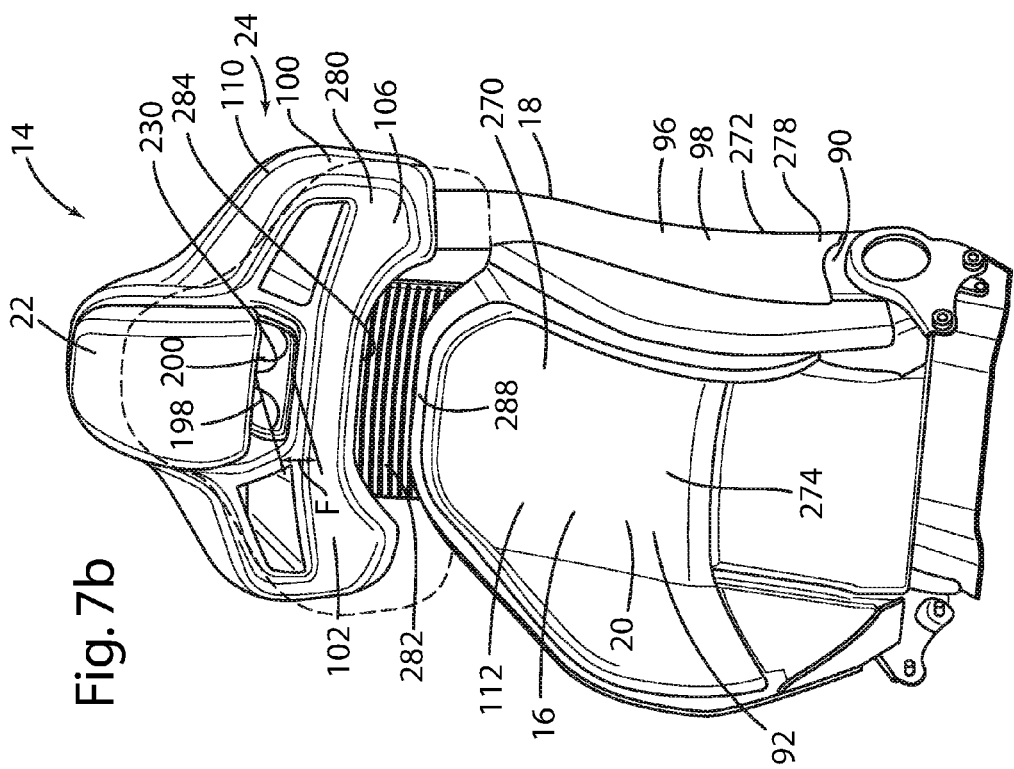
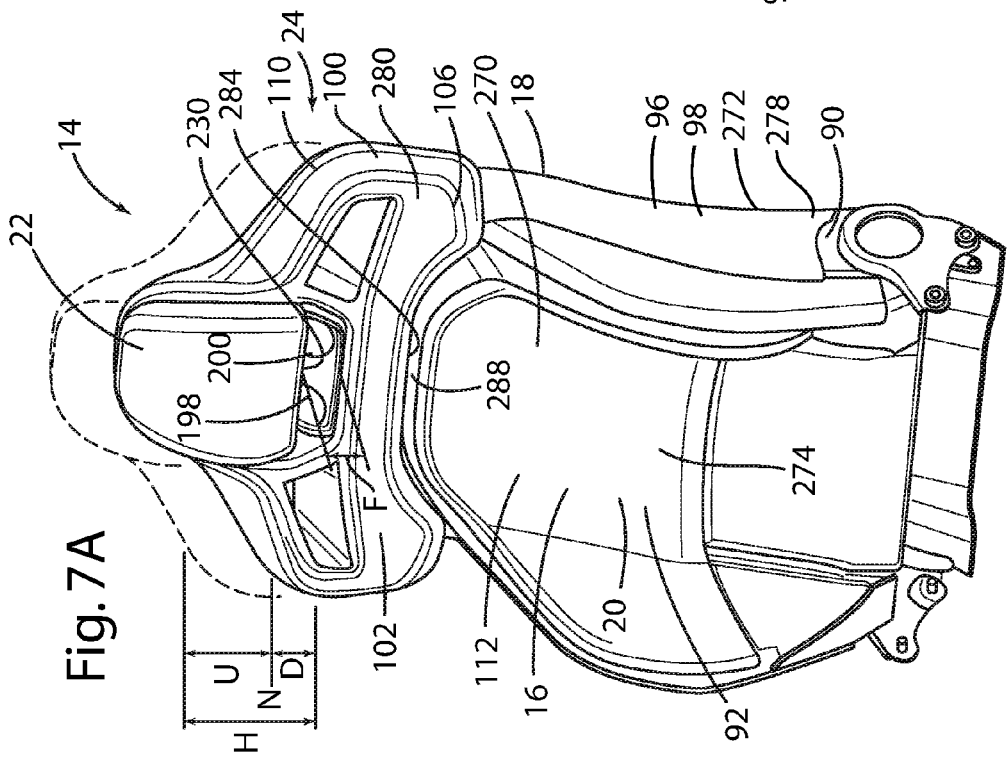

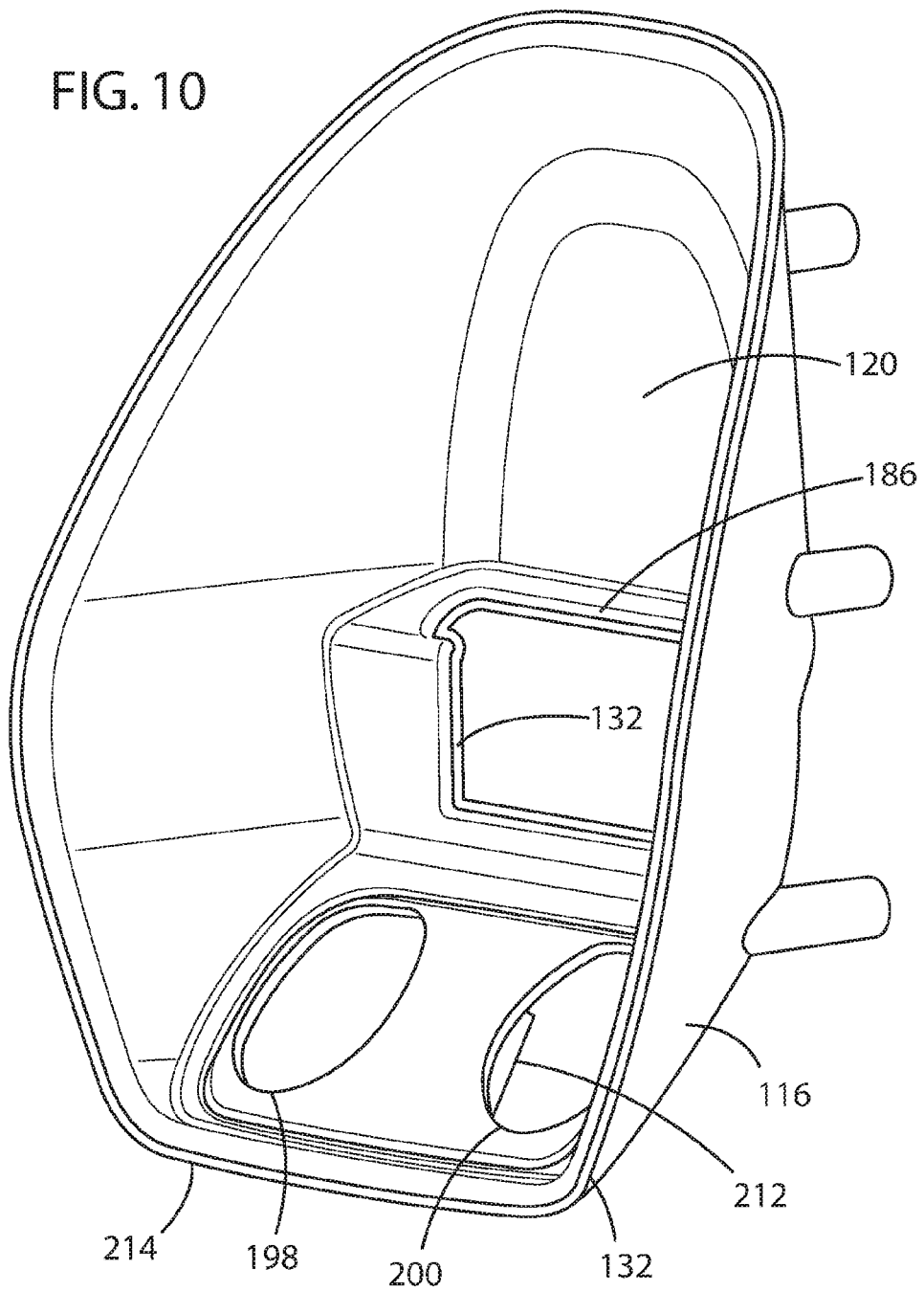

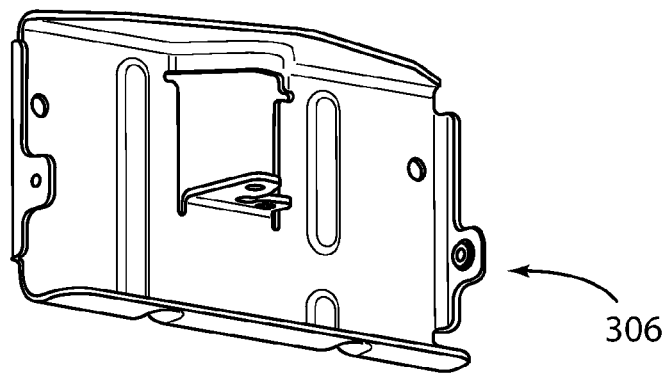
Fig. 23
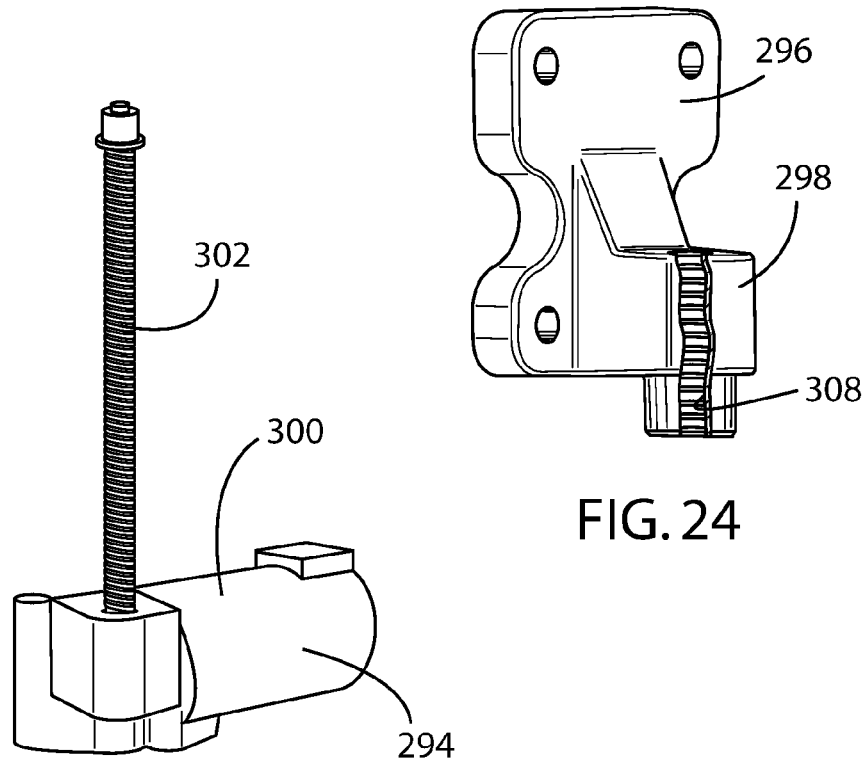
FIG. 24
FIG. 25

INTEGRATED SOUND SYSTEM

FIELD OF THE INVENTION

The present invention generally relates to a vehicle seating assembly for a vehicle, and more particularly to a vehicle seating assembly having a sound system integrated into a forward facing surface of the seating assembly seatback.

BACKGROUND OF THE INVENTION

Motor vehicle customers value and appreciate features that enhance their driving experience. Thus, most motor vehicle occupants enjoy listening to radio programs or pre-recorded audio content while driving and many such occupants enjoy having sound systems that give them the sense of a "surround sound" listening experience while the occupant is seated in the motor vehicle. Likewise, with the advent of integrated mobile telephones and text reading capabilities, a sound system that allows private conversations would be desirable. Hence, a vehicle seating assembly which assists in providing such a "surround sound" listening experience and that allows private conversations would be advantageous.

SUMMARY OF THE INVENTION

One aspect of the present invention includes a vehicle seating assembly for a vehicle that assists in providing such a "surround sound" listening experience.

Another aspect of the present invention includes a vehicle seating assembly wherein the vehicle seating assembly has a vehicle seating assembly for a motor vehicle having a lower seat and a seatback extending upwardly from the lower seat. The seatback comprises a forward facing surface, a rearward facing surface, a headrest mounted on an upper portion of the seatback and received within a headrest cup disposed on the forward facing surface of the seatback, a speaker assembly mounted in the headrest cup, and a resonance cavity formed proximate the headrest cup within which the speaker assembly is received.

Yet another aspect of the present invention includes a vehicle seat having a seatback for a motor vehicle comprising a forward facing surface, a rearward facing surface, a headrest disposed on an upper portion of the seatback and received within a headrest cup formed on the forward facing surface of the seatback, a speaker assembly mounted in the headrest cup, and a resonance cavity formed proximate the headrest cup within which the speaker assembly is received.

Yet another aspect of the present invention includes a vehicle seating assembly for a motor vehicle having a lower seat and a seatback extending upwardly from the lower seat. The seatback comprises a forward facing surface, a rearward facing surface, a headrest mounted on an upper portion of the seatback and received within a headrest cup disposed on the forward facing surface of the seatback, a pair of speakers mounted in the headrest cup, and a resonance cavity formed proximate the headrest cup within which the pair of speakers is received. The resonance cavity forms an enclosed volume and comprises a pair of speaker openings arranged in side-by-side relation on a lower portion of the headrest cup, wherein one each of the pair of speakers is received within one of the pair of speaker openings. The resonance cavity further comprises a pair of rearward facing passive radiator openings arranged in side-by-side relation within which each receives one of a pair of passive radiators.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 7A is a front perspective view of the seatback with the upper movable seatback hood module in the lowermost position in accordance with the present disclosure;

FIG. 7B is a front perspective view of the seatback with the upper movable seatback hood module in the uppermost position in accordance with the present disclosure;

FIG. 10 is a front perspective view of the headrest cup in accordance with the present disclosure;

FIG. 23 is a rear perspective view of the back frame reinforcement bracket of the seatback in accordance with the present invention;

FIG. 24 is a rear perspective view of the motor nut of the seatback in accordance with the present invention;

FIG. 25 is a front perspective view of the electric motor drive unit of the seatback in accordance with the present invention.

DETAILED DESCRIPTION OF THE EMBODIMENTS

Figure 1:
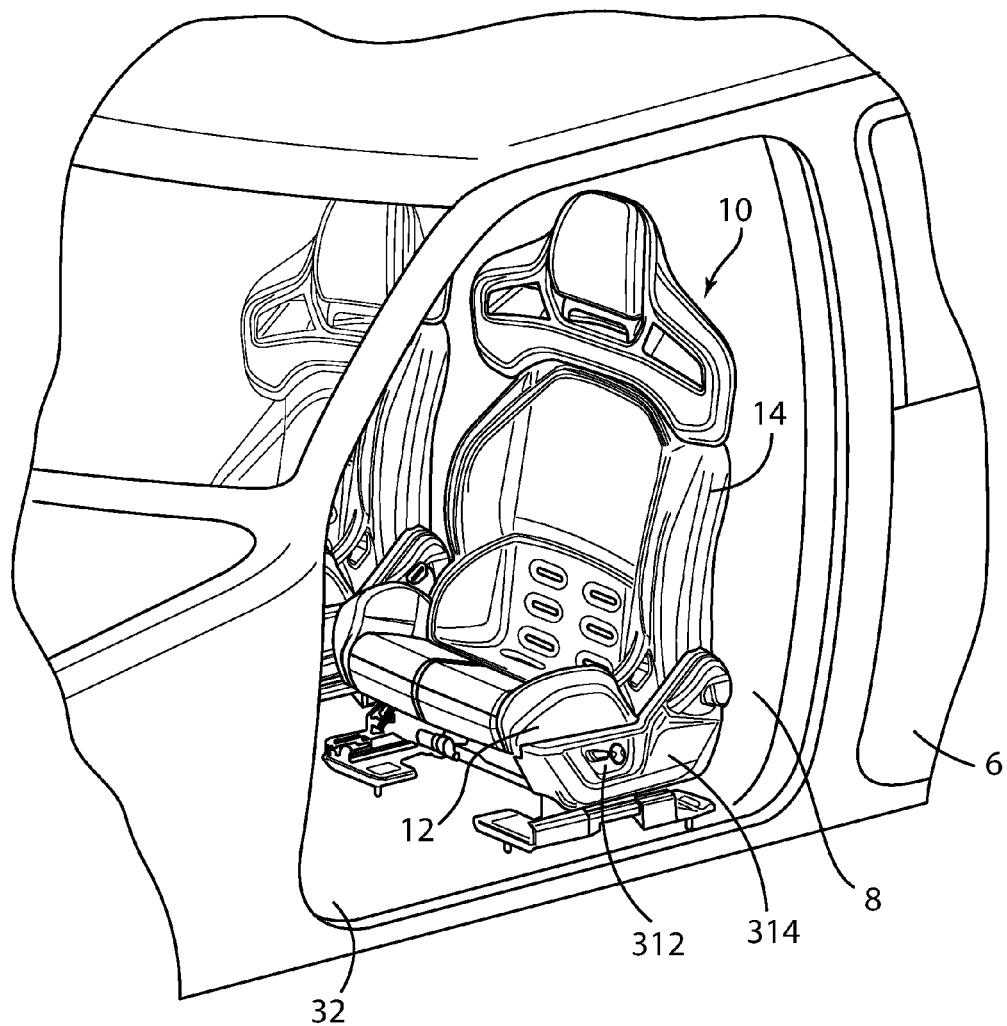
FIG. 1 is a perspective view of the vehicle seating assembly in accordance with the present disclosure installed in the motor vehicle.
Figure 2:
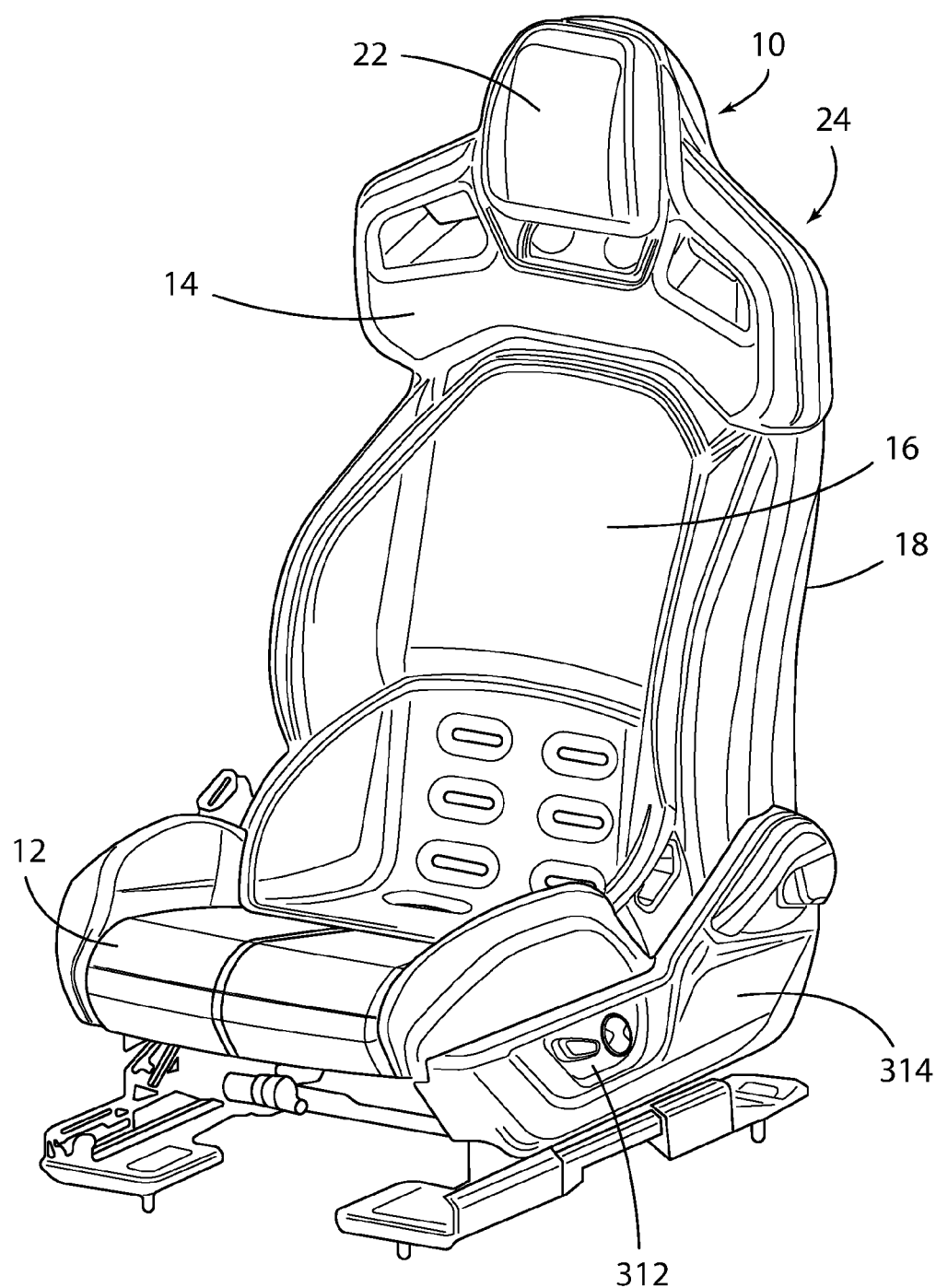
FIG. 2 is a perspective view of the vehicle seating assembly in accordance with the present disclosure.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a vehicle seating assembly 10 is illustrated inside the vehicle cabin 8 of a vehicle 6. The vehicle seating assembly 10 may be a seat for a driver, a seat for a passenger, a rear bucket seat, a rear row of seats, as shown, or any other vehicle seat. The vehicle seating assembly 10 includes a lower seat 12 and a seatback 14 pivotably attached to the lower seat 12. The seatback 14 of the vehicle seating assembly 10 includes a forward facing surface 16 and a rearward facing surface 18, each of which may be covered with a protective and/or decorative material 20. Leather and/or vinyl are often and preferably employed. The vehicle seating assembly 10 also includes a headrest 22 operably coupled to an upper portion 24 of the seatback 14 of the vehicle seating assembly 10. The vehicle seating assembly 10 also typically includes a vehicle seat base 26 configured to provide structural support to the vehicle seating assembly 10. The vehicle seat base 26 is preferably supported on seat mounting rail assemblies 28, as is known in the art. The seat mounting rail assembly 28 is configured to allow the vehicle seating assembly 10 to be adjusted in forward and rearward directions relative to the longitudinal axis of the vehicle 6.

It is understood that the vehicle seating assembly 10 may be positioned in various locations throughout the vehicle other than the illustrated position, such as a passenger side location, a mid-row location, and a rear seat location. The vehicle seating assembly 10 is thereby slidably coupled with a floor 32. It is also conceivable that the vehicle seating assembly 10 may not include the seat mounting rail assembly 28 and alternatively may be fixedly coupled with the floor 32 of the vehicle.

Lower seat 12 includes a cushion frame assembly 30, which in turn includes a cushion frame 34, to which a seat belt buckle 36 is attached. A suspension system 38 is disposed within a rear portion 40 of the cushion frame assembly 30 and beneath and juxtaposed with a cushion foam assembly 42 disposed above for support of the occupant. The suspension system 38 is preferably formed from tunable springs 44 which support a central panel 46. Preferably, at least one variable tension spring 48 is mounted to the cushion frame assembly 30. The suspension system 38 may also include a motor 50, a gear 52, and a spring attachment member 54. A fixedly mounted connecting rod 56 extends between lateral sides 58, 60 of the cushion frame 34 and a sleeve 62 rotatably encircles the connecting rod 56. The motor 50 and gear 52 are operably coupled to the sleeve 62 and the spring attachment member 54 is rigidly mounted on the sleeve 62.

Figure 4:
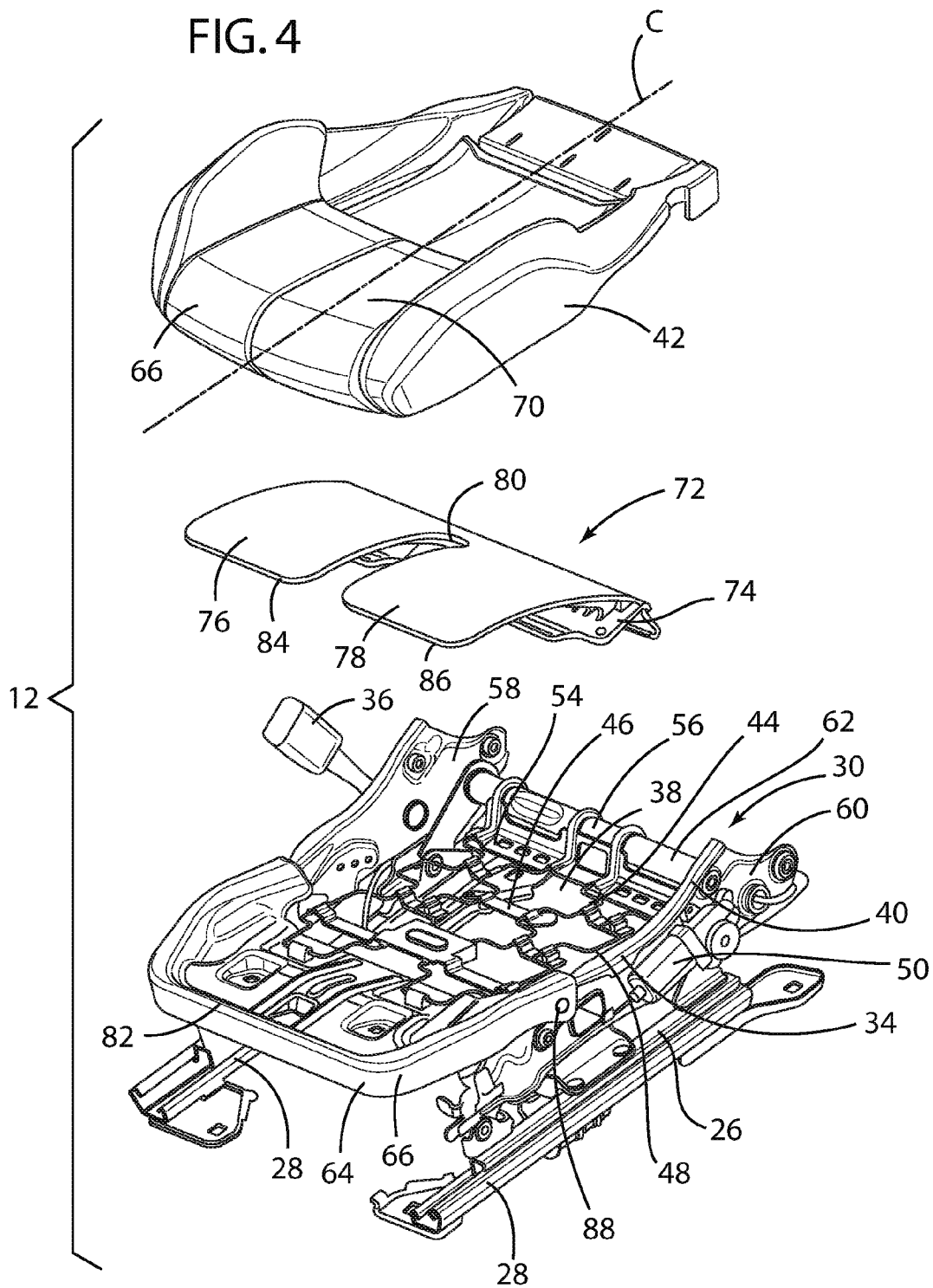
FIG. 4 is a is an exploded perspective view of the lower seat of the vehicle seating assembly in accordance with the present disclosure.
Figure 5:
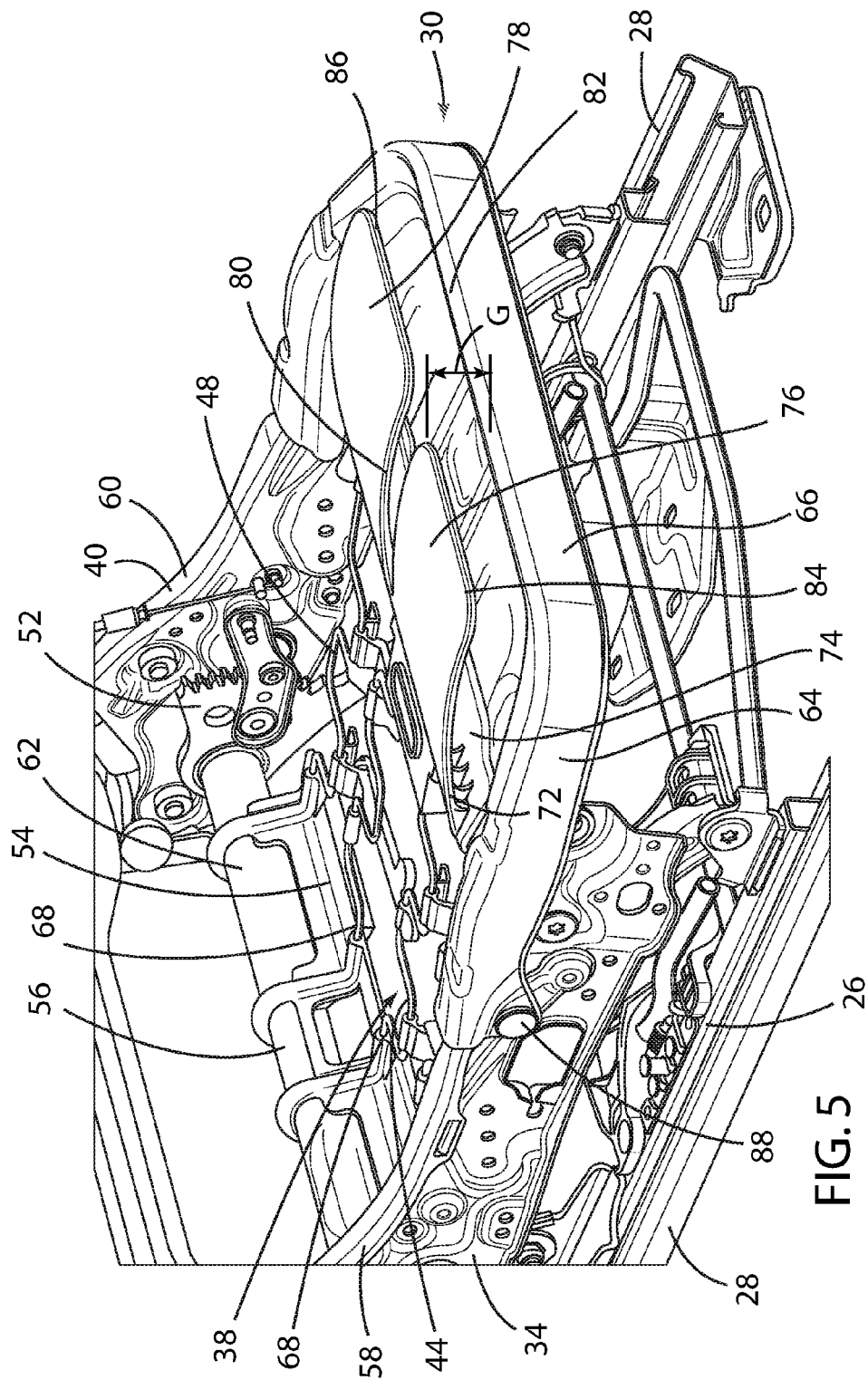
FIG. 5 is a front perspective view of the cushion frame assembly in accordance with the present disclosure.

As shown in FIGS. 4 and 5, the variable tension springs 48 are mounted in tension between the spring attachment member 54 and a cushion pan 64 pivotably mounted to and forming a forward portion 66 of the cushion frame 34. When activated, the motor 50 and gear 52 are adapted to rotate the sleeve 62 and spring attachment member 54. In the illustrated example, rotating the sleeve 62 and spring attachment member 54 rearward raises a rear portion 68 of the variable tension springs 48 and increases the tension applied to the variable tension springs 48. Raising the rear portion 68 of the variable tension springs 48 raises the height of the seating surface 70. Additionally, as is understood by one of ordinary skill in the art, increasing the tension on the variable tension springs 48 decreases the flex or extension thereof, which means the variable tension springs 48 and cushion foam assembly 42 will move downward a smaller distance when placed under load, such as when an occupant sits on the vehicle seating assembly 10. Conversely, rotating the sleeve 62 and spring attachment member 54 forward lowers the rear portion 68 of the variable tension springs 48 and decreases the tension applied to the variable tension springs 48. This increases the flex or extension of the variable tension springs 48, which means the variable tension springs 48 and cushion foam assembly 42 will move downward a greater distance when an occupant is seated in vehicle seating assembly 10. Further, lowering the rear portion 68 of the variable tension springs 48 lowers the height of the seating surface 70.

Figure 6:
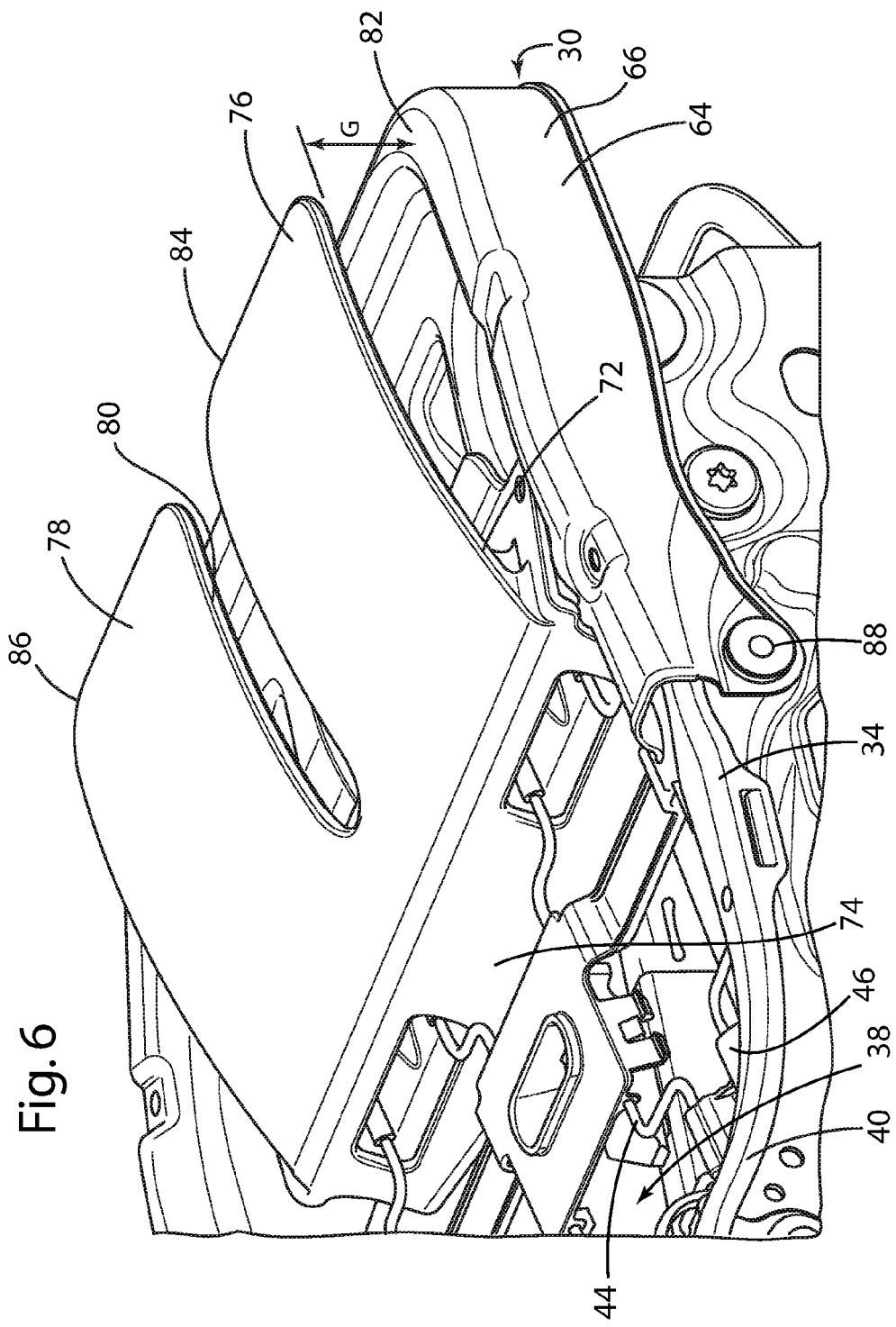
FIG. 6 is a rear perspective view of the cushion frame assembly in accordance with the present disclosure.

As shown in FIGS. 4, 5, and 6, a cushion leg jounce bracket 72 is attached to a rear portion 65 of the cushion pan 64, preferably at a point about midway on the cushion frame 34. The cushion leg jounce bracket 72 includes a base 74 attached to the cushion pan 64 with two extended jounce paddles 76, 78 that act much like a diving board or cantilevered beam to support the back of the thighs. Preferably, the cushion leg jounce bracket 72 forms the pair of jounce paddles 76, 78 symmetrically disposed along either side of a longitudinal centerline C of the vehicle seating assembly, with a notch 80 separating each of the jounce paddles 76, 78 at the base 74 along the longitudinal centerline C of the vehicle seating assembly. Preferably, each of the jounce paddles 76, 78 is about 150 mm wide transverse to the longitudinal centerline C of the vehicle so as to provide adequate support to the back of each of an occupant's thighs.

Each of the jounce paddles 76, 78 extends upwardly and forwardly to form a vertical gap G between a distal end 84, 86 of each jounce paddle 76, 78 and a forward edge 82 of the cushion pan 64 and is thereby preferably disposed to independently support one of the occupant's thighs. Each of the jounce paddles 76, 78 may be resiliently urged downwardly by the weight of the occupant's thigh without contacting the forward edge 82 of the cushion pan 64 and thereby provide resilient support. However, is it conceivable that the cushion leg jounce bracket 72 may be arranged having a single jounce paddle, or a pair of jounce paddles 76, 78 that may be selectively coupled and uncoupled to act independently under a respective thigh of the occupant.

The cushion leg jounce bracket 72 is preferably formed as a single molded component, but may be formed from two symmetrical pieces arranged on either side of the longitudinal centerline C of the vehicle seating assembly 10, each comprising one of the jounce paddles 76, 78. Preferably, the cushion leg jounce bracket 72 is formed from glass-filled injection molded nylon having a thickness of about between 2.5 and 3.5 mm. However, it should be noted that the cushion leg jounce bracket 72 may be effectively tunable to specific performance criteria by appropriate selection of the material from which the cushion leg jounce bracket 72 is fabricated, the thickness of the cushion leg jounce bracket 72, the addition of ribs (not shown) on the bottom of the paddles on the cushion leg jounce bracket 72, and the addition of a split line along the cushion leg jounce bracket 72 proximate the base 74 of the notch 80 separating the pair of jounce paddles 76, 78.

Figure 3:
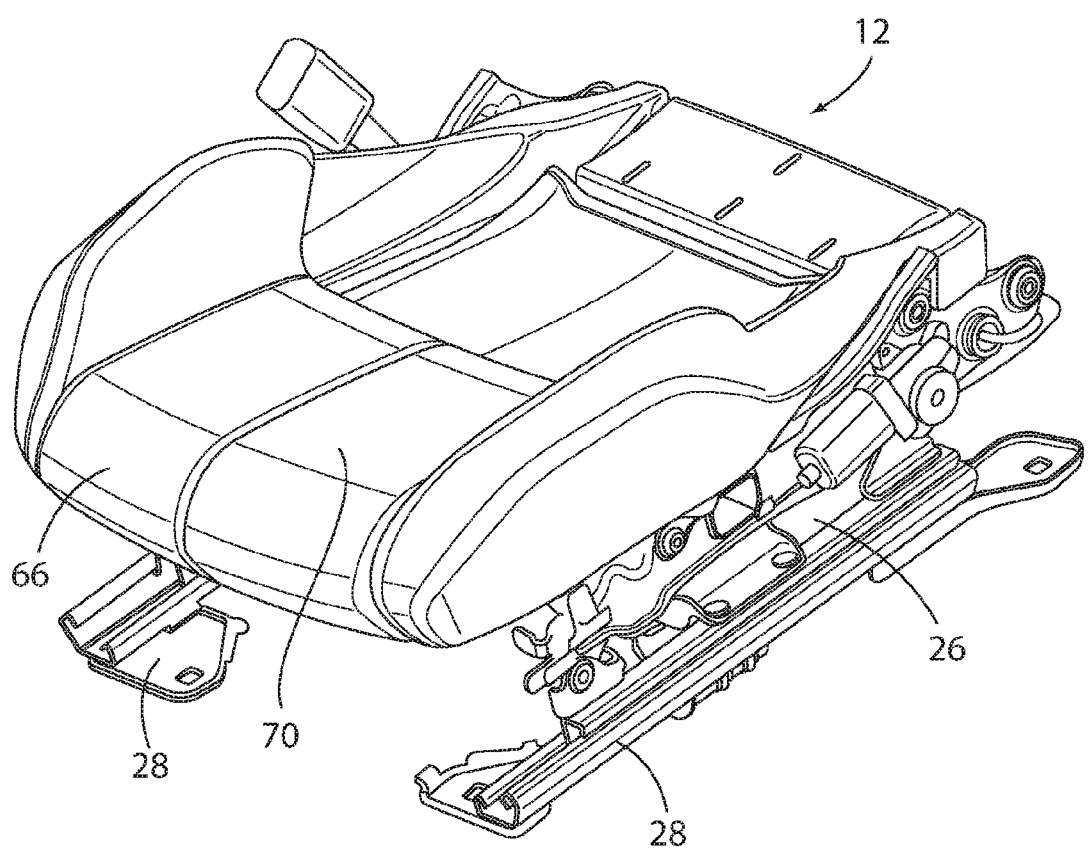
FIG. 3 is a perspective view of the lower seat of the vehicle seating assembly in accordance with the present disclosure.

The cushion foam assembly 42 is disposed above and is attached to the cushion frame 34 as shown in FIG. 3, and is supported at a forward portion 66 by the cushion leg jounce bracket 72. Preferably, the underside of the cushion foam assembly 42 is provided with a durable surface material that is particularly wear resistant, in that the relative movement between the jounce paddles 76, 78 of the cushion leg jounce bracket 72 and the underside of the cushion foam assembly 42 will tend to wear on the underside of the cushion foam assembly 42.

Preferably, the cushion pan 64 is pivotably, and thereby adjustably, mounted to the cushion frame 34 by a pair of pivots 88 located on either side of the cushion frame assembly 30. The cushion pan 64 so mounted may be manually and pivotally adjusted by use of a knob or lever (not shown), as is well known in the seating arts, or a remotely pivotally adjusted by use of a motorized gear assembly (not shown), as is also well known in the seating arts.

The cushion leg jounce bracket 72 disclosed herein provides a flexible thigh support assembly that assembles directly to the cushion pan 64. The cushion leg jounce bracket 72 provides passive supports that are capable of acting independently under the load of each leg, and thereby reducing leg muscle fatigue and provide support for important vehicle functions, especially such as acceleration and braking with the right leg and manual gear shift or relaxation on the left leg.

Figure 16:
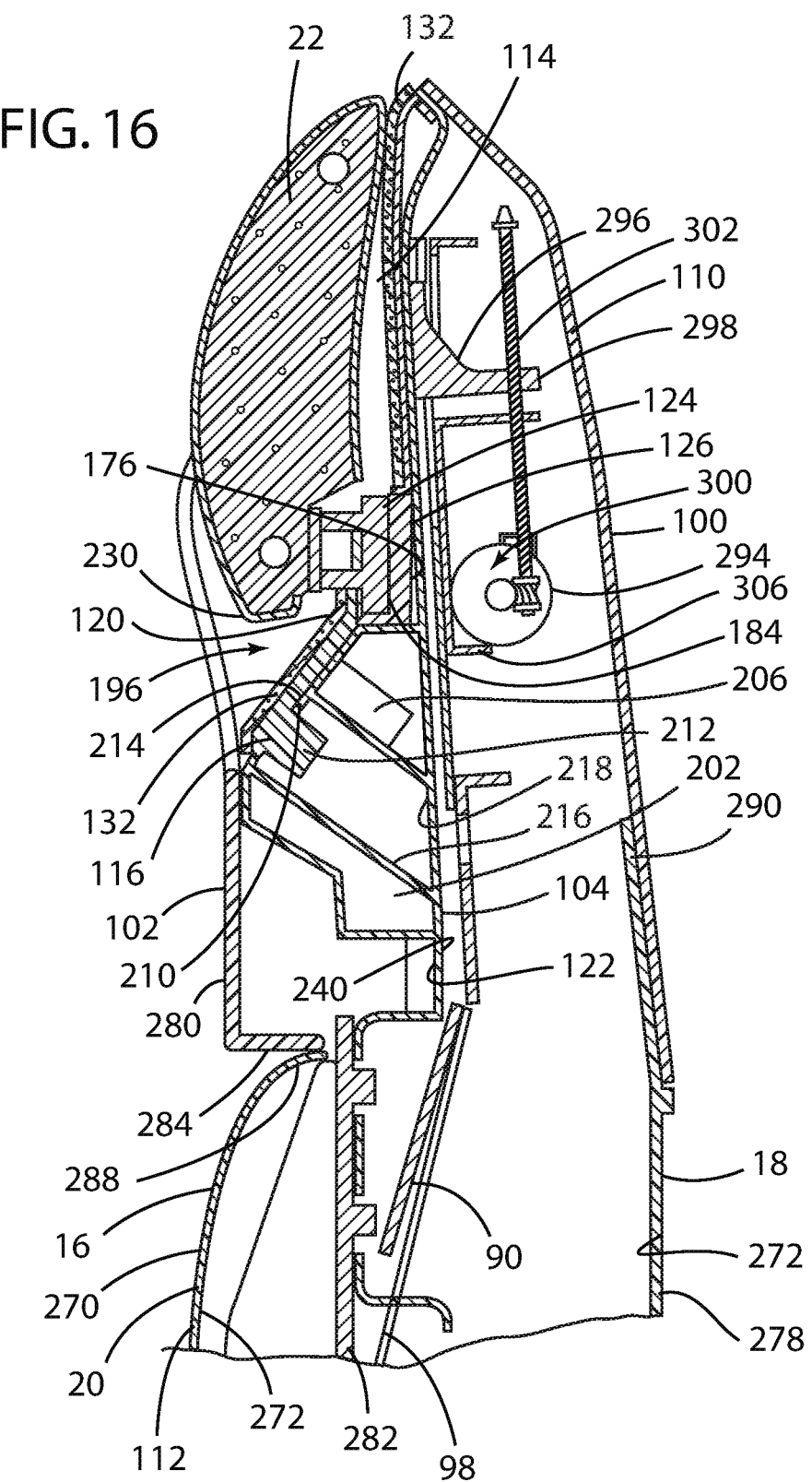
FIG. 16 is a cross-sectional view of the upper portion of the seatback in accordance with the present disclosure.
Figure 17:
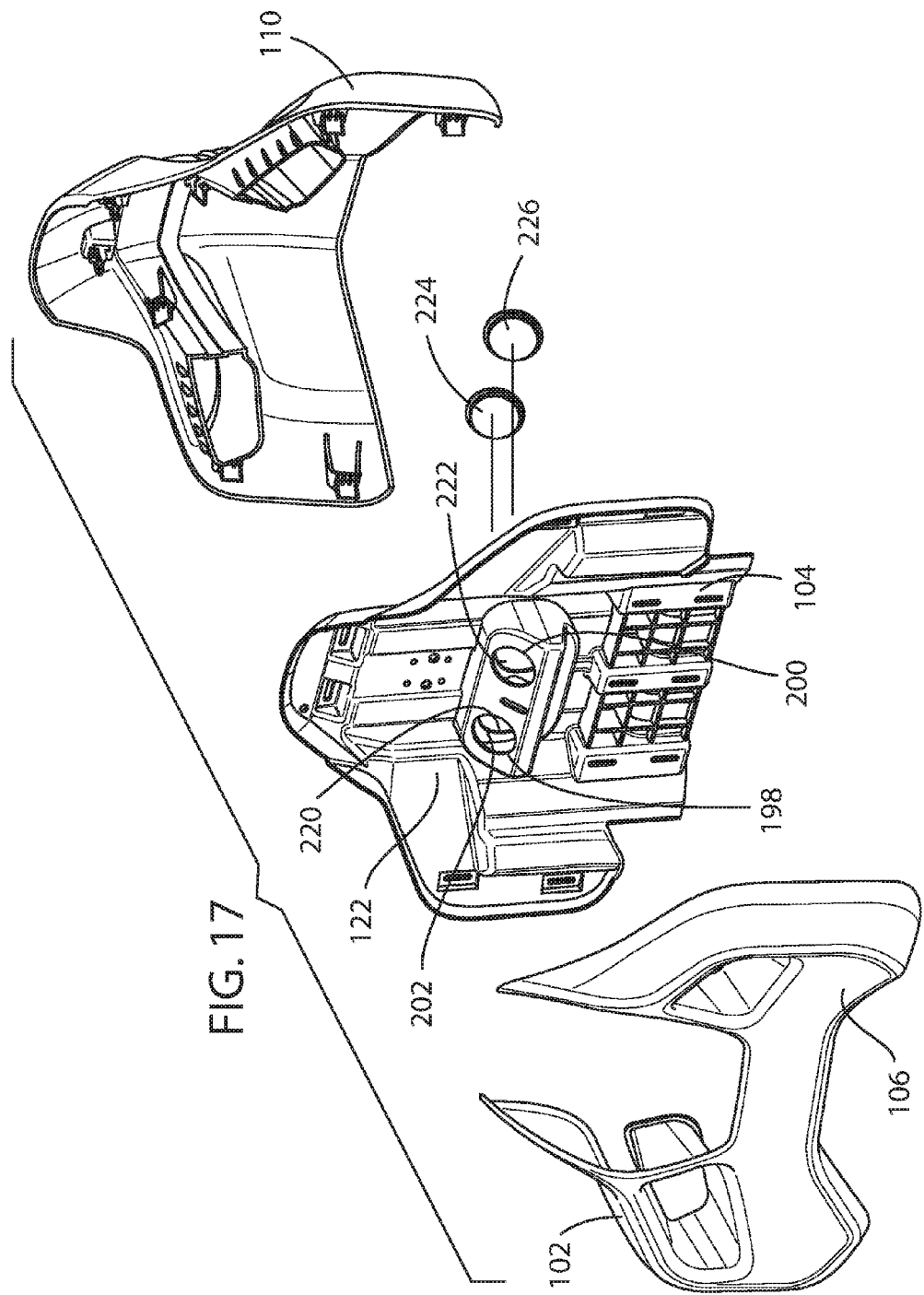
FIG. 17 is an exploded front perspective view of the upper movable seatback hood module in accordance with the present disclosure.
Figure 18:
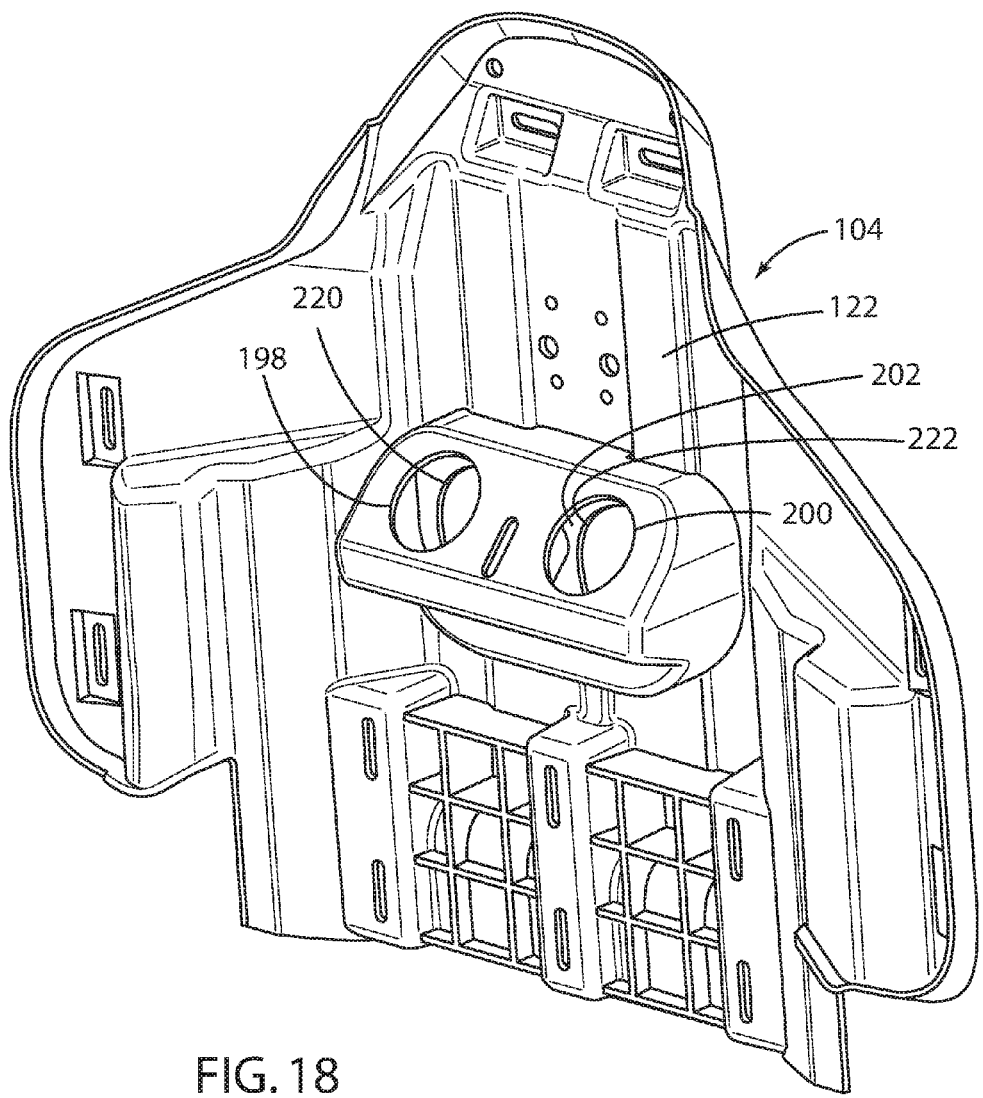
FIG. 18 is a front perspective view of the rear upper slide bracket of the seatback in accordance with the present disclosure.

As shown in FIGS. 7A, 7B, 16, 17, and 20, the seatback 14 includes a seatback frame assembly 90, that includes a back carrier 94, a front cushion 92, and a rear trim panel 96 that enclose the seatback frame assembly 90 in a clamshell type arrangement. Preferably, as will be discussed more fully below, the seatback 14 includes a lower stationary seatback base portion 98 and an upper movable seatback hood module 100 that allows the upper portion 24 of the seatback 14 to be raised and lowered in accordance with the occupant's preference and, in particular, to properly locate the headrest 22 and a speaker assembly 196, both addressed in more detail below. The upper movable seatback hood module 100 includes a front upper seatback slide bracket 102 that forms a front of the upper movable seatback hood module 100, rear upper seatback slide bracket 104, hood foam 106, and a hood back trim panel 110. The front upper seatback slide bracket 102 and hood back trim panel 110 enclose the rear upper seatback slide bracket 104 in a clamshell-type arrangement, as shown in FIG. 17.

Figure 13:
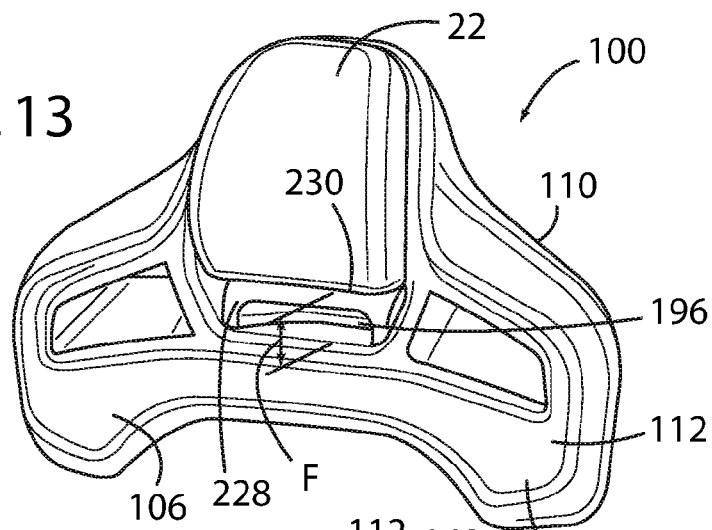
FIG. 13 is a front perspective view of the upper movable seatback hood module in accordance with the present disclosure.

The forward facing surface 112 of the upper portion 24 of the seatback 14 includes a central recess 114 that corresponds with and receives a headrest cup 116. The headrest cup 116 is preferably formed as a polymeric shell mounted within the central recess 114 and on the forward facing surface 112 of the seatback 14 and is disposed in front of a forward surface 122 of the rear upper seatback slide bracket 104. In turn, the headrest 22 is received within a recess 120 of the headrest cup 116 disposed on the forward facing surface 112 of the seatback 14. As shown in FIG. 13, the headrest 22 is thereby mounted within the upper movable seatback hood module 100 on the upper portion 24 of the seatback 14.

In particular, in the case of high-performance seats installed in motor vehicles that are designed for racing and motor track use, it is often required that the occupants, especially the driver, wear a helmet or other type of protective headgear adapted to protect the head of the occupant. However, existing headrests are often in the way and tend to push the head of the driver forward to uncomfortable positions due to the bulk of existing headrests. While such headrests can often be removed, rear head support is likewise removed. In the case of performance seats that are intended to be used in racing or sporting applications, this is especially unacceptable. Instead, what was needed was a performance seat that was adaptable to accommodate racing helmets and head gear, especially in the head region where movement and viewing flexibility is most needed, while also providing adequate support.

Accordingly, the present disclosure provides a headrest 22 that can be easily assembled and installed in the seatback 14, as well as be readily removable and reinstalled without the need for tools or adjustment. The headrest 22, that further provides a pivoting adjustment mechanism and supporting structure, as discussed below, may be readily attached to the upper portion 24 of the seatback 14 by means of a "dovetail" design to secure it in place, yet allow the headrest 22 to be readily removed for racing or motor track use or service requirements and readily reinstalled. That is, as shown in FIGS. 8, 9B, and 13-16, the headrest 22 is mounted to the forward surface 122 of the rear upper seatback slide bracket 104 via a headrest dovetail 124 that is removably received within a dovetail receiver 126 mounted to the rear upper seatback slide bracket 104. Preferably, the headrest may be articulated forward and backward around a pair of pivots 128 near its base 130 and the headrest 22 can be entirely removed from the seatback 14, as discussed below.

The headrest 22 disclosed herein avoids the problems of existing headrests by being installed within the headrest cup 116 and by being readily removable and reinstallable, thereby allowing the headrest 22 to be removed from the seatback 14 to expose the headrest cup 116 within which the driver's or passenger's helmet can be received. The present disclosure avoids the disadvantages of prior removable headrest designs and replaces the posts that extend downwardly to allow the vertical adjustment for the headrest 22 height with a dovetail attachment mechanism. With the headrest 22 simply removed from the seatback 14, as is discussed further detail below, an ample cavity is formed within which a helmet or other headgear may be received to allow the driver and/or passenger to occupy the seat with relative comfort. In such a case, the headrest cup 116, even with the headrest 22 removed, still offers head and neck support in the event of a rear impact to minimize whiplash and other injuries. In this regard, it is further noted that the headrest cup 116 is preferably lined with a rubber padding 132, so that with the headrest 22 removed, any jostling or other contact of the occupant's helmet or headgear with the headrest cup 116 is dampened and minimized.

Figure 12:
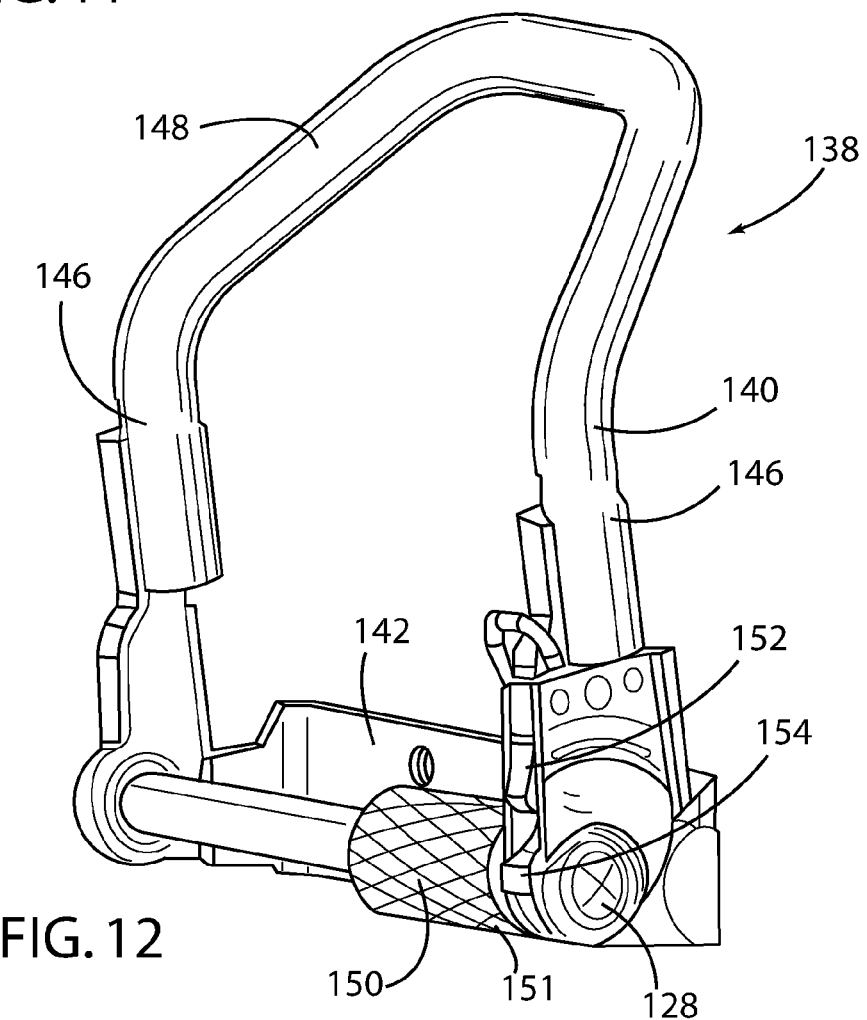
FIG. 12 is a front perspective view of the U-shaped member of the headrest in accordance with the present disclosure.

The headrest 22 includes a headrest cover 134 that encases the headrest 22, which further includes a headrest front foam member 136, an EPP foam member 137, a headrest mechanism 138 comprising a generally U-shaped tubular member 140 and a rear mounting base plate 142, and a rear foam member 144. Preferably, the U-shaped tubular member 140 and the rear mounting base plate 142 are fabricated from steel. The U-shaped tubular member 140 comprises two vertically and upwardly extending arms 146 that each engages a respective right and left end of an upwardly and rearwardly tilted U-shaped support 148 for providing rigid structural support to the headrest 22, as shown. The U-shaped tubular member 140 is pivotally mounted to the rear mounting base plate 142 by the pair of opposed pivots 128, one of which includes a spring-loaded ratchet mechanism 150, as shown in FIG. 12, which in one embodiment normally urges the headrest 22 to a forward position by a spring 151. In use, the headrest 22 can be pivoted forward from a maximum rearward position in discrete increments by the action of a pawl 152 engaging a cam 154 until reaching a maximum forward position. After reaching the maximum forward position, the pawl 152 is released from the cam 154 to release the ratchet mechanism 150 which, in turn, releases and allows the return of the headrest 22 to its rearward position. While the headrest 22 shown herein is intended for manual adjustment, it is contemplated that a motor and quick disconnect for the power to the motor (not shown) can be provided to facilitate ready removal of the headrest 22 from the seatback 14 and reinstallation thereof.

Figure 9:
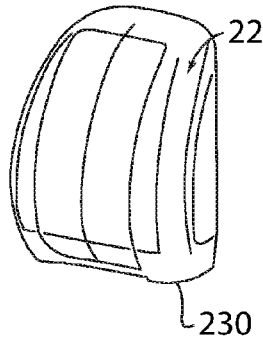
FIG. 9 is a front perspective view of the headrest in accordance with the present disclosure.
Figure 9A:
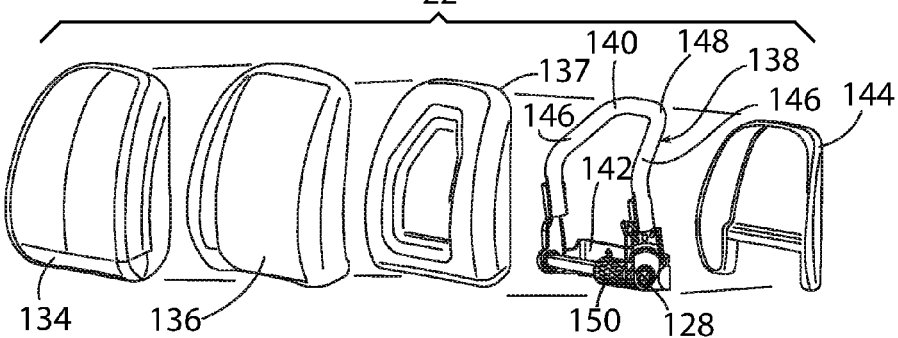
FIG. 9A is an exploded front perspective view of the headrest in accordance with the present disclosure.
Figure 9B:
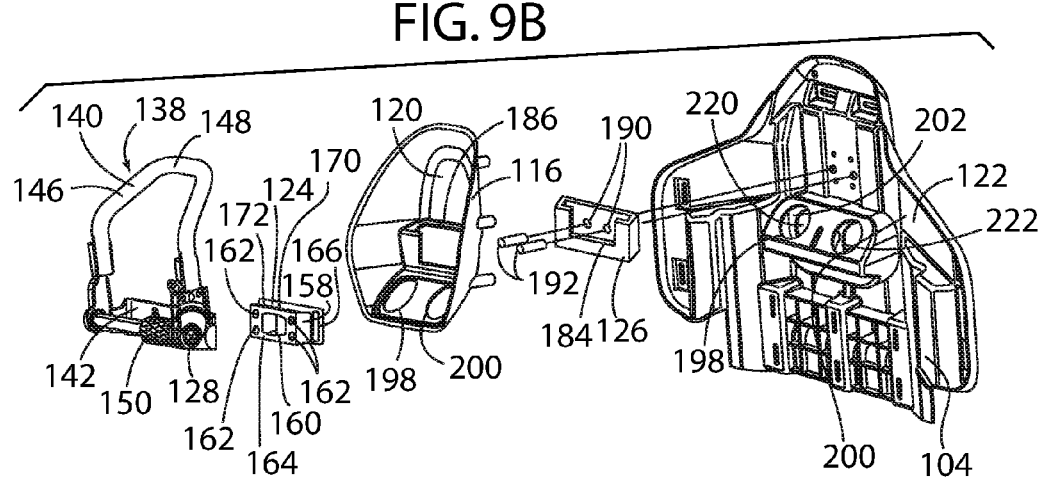
FIG. 9B is an exploded front perspective view of the headrest, headrest dovetail, headrest cup, dovetail receiver, and rear upper slide bracket in accordance with the present disclosure.
Figure 11:
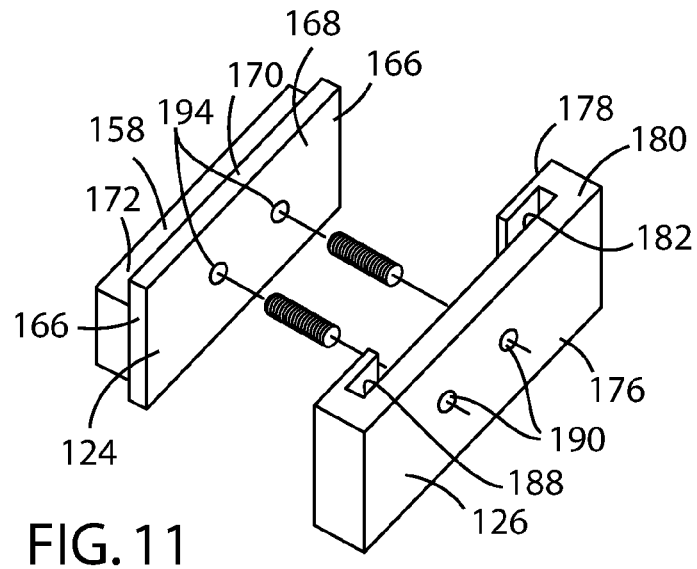
FIG. 11 is a rear exploded perspective view of the headrest dovetail, roller bearings, and dovetail receiver in accordance with the present disclosure.

As shown in FIGS. 9B and 11, the dovetail attachment mechanism includes the headrest dovetail 124 mounted to the rear of the headrest 22, in particular to the rear mounting base plate 142, via a plurality of mechanical fasteners, as is known in the art. The headrest dovetail 124 comprises a rectangular block member 158 that preferably has a cavity 160 formed in a central portion thereof to minimize weight. A plurality of mechanical fastener openings 162 is provided on a forward surface 164 of the rectangular block member 158 about the cavity 160 to facilitate attachment of the rectangular block member 158 to the rear mounting base plate 142 of the headrest 22. A pair of laterally engaging tabs 166 extends laterally in both side directions beyond the lateral dimensions of the rectangular block member 158 proximate a rear surface 168 of the headrest dovetail 124. An upper edge 170 extends slightly above an upper surface 172 of the rectangular block member 158.

The dovetail receiver 126, best shown in FIGS. 9B, 11, and 16, is mounted to the forward surface 122 of the rear upper seatback slide bracket 104 via a plurality of conventional mechanical fasteners. That is, the dovetail receiver 126 has a rear surface 176 that is juxtaposed with the forward surface 122 of the rear upper seatback slide bracket 104 and is rigidly attached thereto. A forward surface 178 and an upper surface 180 of the dovetail receiver 126 are provided with an opening that forms a T-shaped slot 182. The T-shaped slot 182 has a lateral width on the upper surface 180 that exceeds the lateral width of the forward surface 178. The T-shaped slot 182 is thus formed on the forward surface 178 and upper surface 180 of the dovetail receiver 126. A lower surface within the T-shaped slot 182 forms a bottom shoulder 184 thereof.

Figure 15:
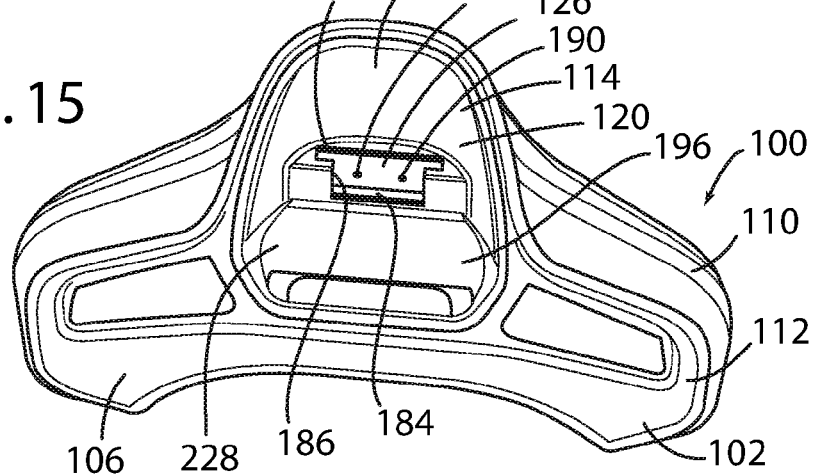
FIG. 15 is a front perspective view of the upper movable seatback hood module with the headrest removed in accordance with the present disclosure.

A T-shaped slot 186 in the headrest cup 116 is shaped to conform to the shape of the T-shaped slot 182, the headrest cup 116 concealing the remaining structure of the dovetail receiver 126 in order to provide an aesthetically pleasing appearance, as shown in FIG. 15. The dovetail receiver 126, so situated relative the T-shaped slot 186, is adapted to receive the laterally engaging tabs 166 of the headrest dovetail 124 as the headrest dovetail 124 is slid downwardly through the T-shaped slot 186 and into an upper opening 188 of the T-shaped slot 182 in the dovetail receiver 126 from above until bottoming out on the bottom shoulder 184. With the laterally engaging tabs 166 of the headrest dovetail 124 so inserted into the T-shaped slot 182, the headrest 22 is rigidly attached to the headrest dovetail 124 and may thereby be securely installed in the central recess 114 of the seatback 14.

The T-shaped slot 182 in the dovetail receiver 126 is further provided with a pair of recesses 190 within which a pair of spring-loaded roller bearings 192 is mounted. A matching pair of indented dimples 194 is provided in the rear surface 168 of the headrest dovetail 124 and is aligned with each of the spring-loaded roller bearings 192 when the headrest 22 is installed. With the indented dimples 194 so aligned with and engaged by the spring-loaded roller bearings 192, the spring-loaded roller bearings 192 are resiliently urged into the indented dimples 194 and secure the headrest dovetail 124 within the T-shaped slot 182 of the dovetail receiver 126. However, by simply exerting a moderate upward force on the headrest 22, the spring-loaded roller bearings 192 can be urged rearwardly, so as to release their engagement with the indented dimples 194. The headrest dovetail 124 can thereby be easily detached from the T-shaped slot 182 of the dovetail receiver 126 for removal of the entire headrest 22 from the seatback 14. Thus, the headrest 22 can be readily removed from the seatback 14 without the use of tools or the need for adjustment. Similarly, the headrest 22 can be readily reinstalled into the headrest cup 116 of the seatback 14 again without the use of tools or the need to perform any types of adjustment.

It should be noted that the disclosed embodiment for mounting the headrest 22 to the upper portion 24 of the seatback 14 itself provides no vertical adjustment of the headrest 22 relative to the upper portion 24 of the seatback 14. Rather, as set forth the below, the height of the headrest 22 can be adjusted by adjustment of the upper portion 24 of the seatback 14. This is particularly advantageous in that existing headrest assemblies using adjustable posts are typically movable within a vertical range of about 50 cm. However, since the upper portion 24 of the seatback 14 of the present disclosure, as further discussed below, is adapted to move within a range H of 75 mm, as shown in FIG. 7A, the headrest 22 disclosed herein is provided with even greater adjustability.

Figure 14:
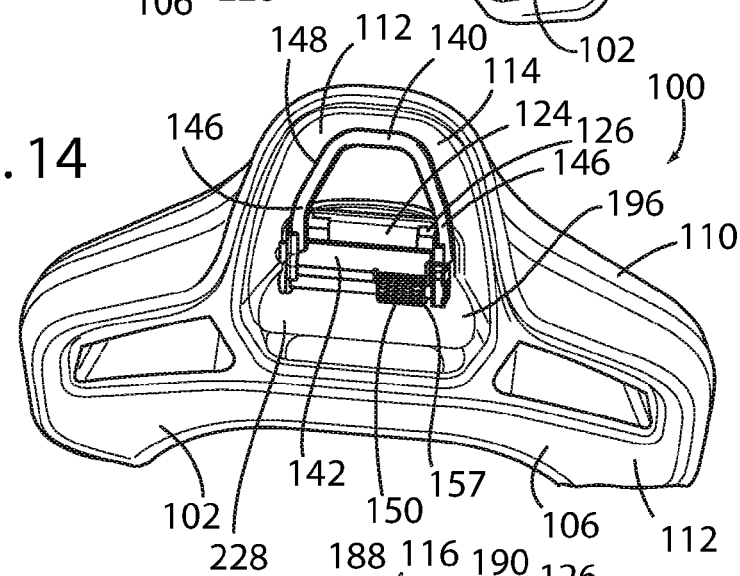
FIG. 14 is a front perspective view of the upper movable seatback hood module and the U-shaped member installed in accordance with the present disclosure.

In addition, as shown in FIGS. 13, 14, and 15, a speaker assembly 196 is mounted proximate the bottom of the headrest cup 116 via a pair of speaker openings 198, 200 through both the headrest cup 116 and rear upper seatback slide bracket 104 that receive a pair of speakers 206 shown in FIG. 16. The speaker assembly 196 can include traditional woofer and tweeter systems to more recent piezo-electric speaker systems. Preferably, the speakers include dual 7.5-watt drivers.

A resonance cavity 202 is formed proximate to and just below the headrest cup 116, preferably within the rear upper seatback slide bracket 104, within which the speaker assembly 196 is received. The resonance cavity 202 comprises an enclosed volume, preferably about 290 cm$^3$. Since the resonance cavity 202 is formed in the rear upper seatback slide bracket 104, it is thus enclosed within the seatback 14 between the front upper seatback slide bracket 102 and hood back trim panel 110.

Figure 8:
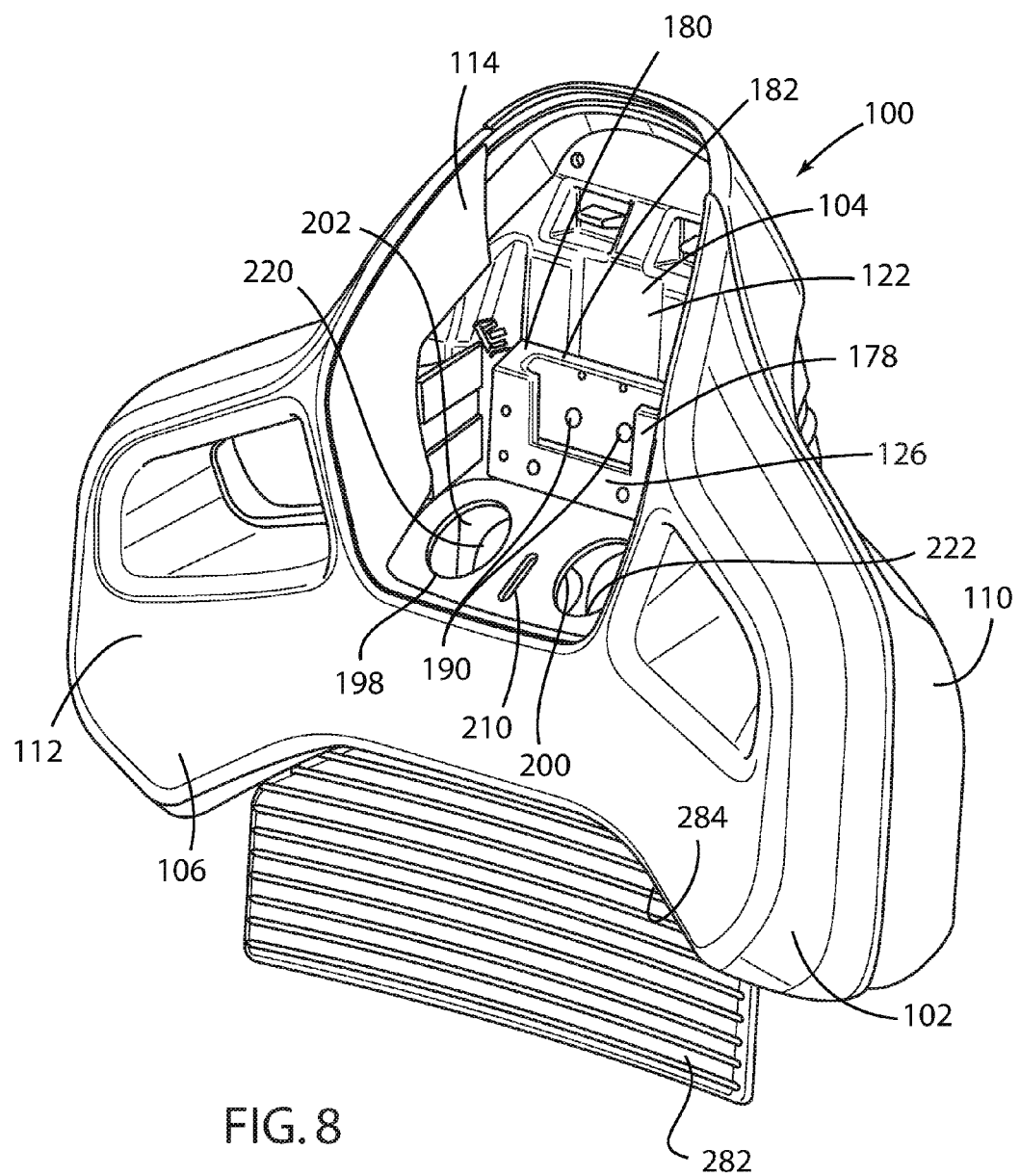
FIG. 8 is a front perspective view of the upper movable seatback hood module in accordance with the present disclosure.

The pair of speaker openings 198, 200 is preferably arranged in side-by-side relation on the lower portion 204 of the headrest cup 116 and the speaker assembly 196 comprises the pair of speakers 206, each received and mounted within one of the pair of speaker openings 198, 200. The pair of speaker openings 198, 200 opens into the headrest cup 116 disposed on the lower portion 204 of the headrest cup 116. As shown in FIG. 8, a slot 210 is formed between the pair of speaker openings 198, 200, the slot 210 being provided to receive a clip 212 depending from a bottom surface 214 of the polymeric shell of the headrest cup 116 by which the polymeric shell of the headrest cup 116 is partially attached to the seatback 14. It has been found that a positive and rigid attachment of the polymeric shell of the headrest cup 116 to the seatback 14 proximate the speakers 206 prevents undesired vibration of the polymeric shell of the headrest cup 116 when the speakers volume is raised. Further, the slot 210 is sealed from the resonance cavity 202 by an enclosed cap 216 extending downwardly from the slot 210 into contact with the rearward surface 218 of the resonance cavity 202.

The resonance cavity 202 further includes a pair of passive radiator openings 220, 222 arranged in side-by-side relation and disposed on a rear surface 240 of the rear upper seatback slide bracket 104, within which each one of a pair of the passive radiators 224, 226 is received. The pair of passive radiator openings 220, 222 forms rearward facing openings. The pair of passive radiators 224, 226 each comprises a circular elastomeric diaphragm.

A headrest cup speaker grill 228 is disposed above the speaker openings 198, 200 and below the headrest 22, and a forward facing gap F is provided between the headrest cup speaker grill 228 and a lower portion 230 of the headrest 22, as shown in FIG. 7B. The headrest cup speaker grill 228 is comprised of a thin gauge perforated metal mesh. Preferably, the perforated metal mesh is comprised of aluminum mesh about 0.005 inches in thickness.

As noted above, the seatback 14 includes the lower stationary seatback base portion 98 and an upper movable seatback hood module 100 that allows the upper portion 24 of the seatback 14 to be raised and lowered in accordance with the customer's preference and, in particular, to properly locate the headrest 22 and the speaker openings 198, 200. The lower stationary seatback base portion 98 is supported by the seatback frame assembly 90, while the upper movable seatback hood module 100 is vertically adjustable relative the lower stationary seatback base portion 98 and is supported by the front upper seatback slide bracket 102 in cooperation with the rear upper seatback slide bracket 104.

Figure 19:
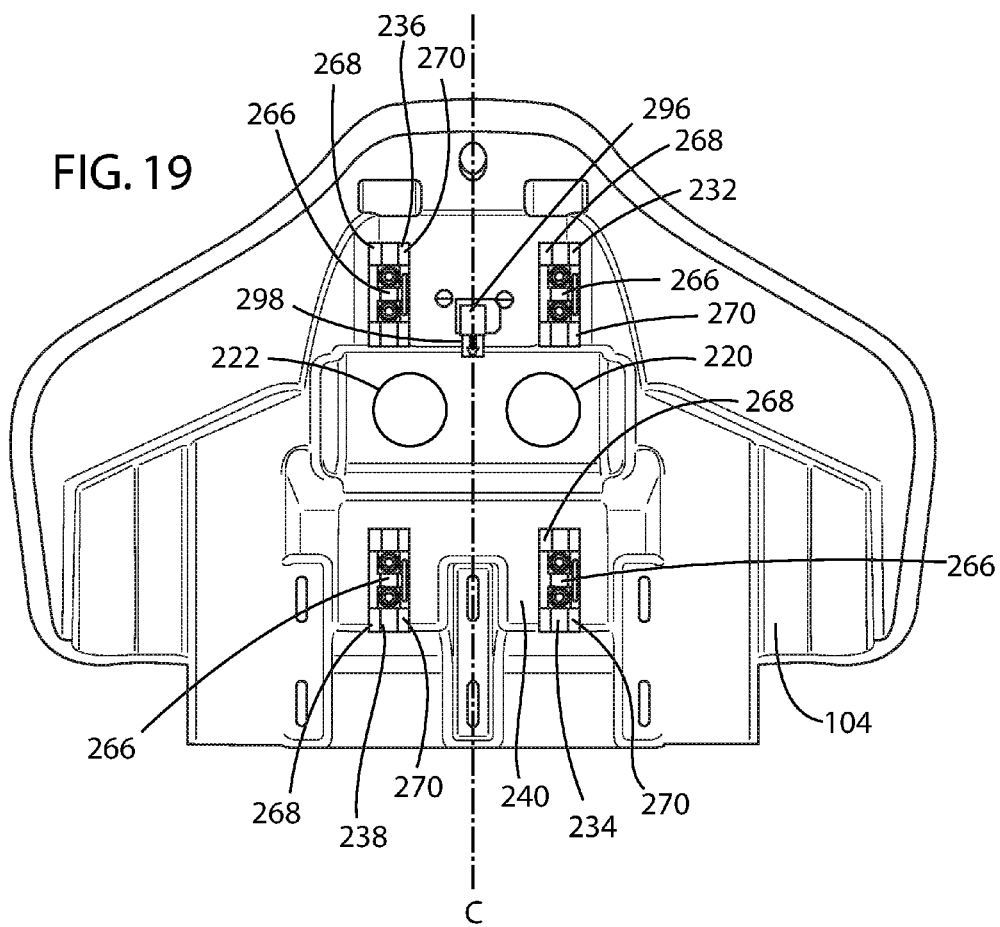
FIG. 19 is a rear view of the rear upper slide bracket of the seatback in accordance with the present disclosure.
Figure 20:
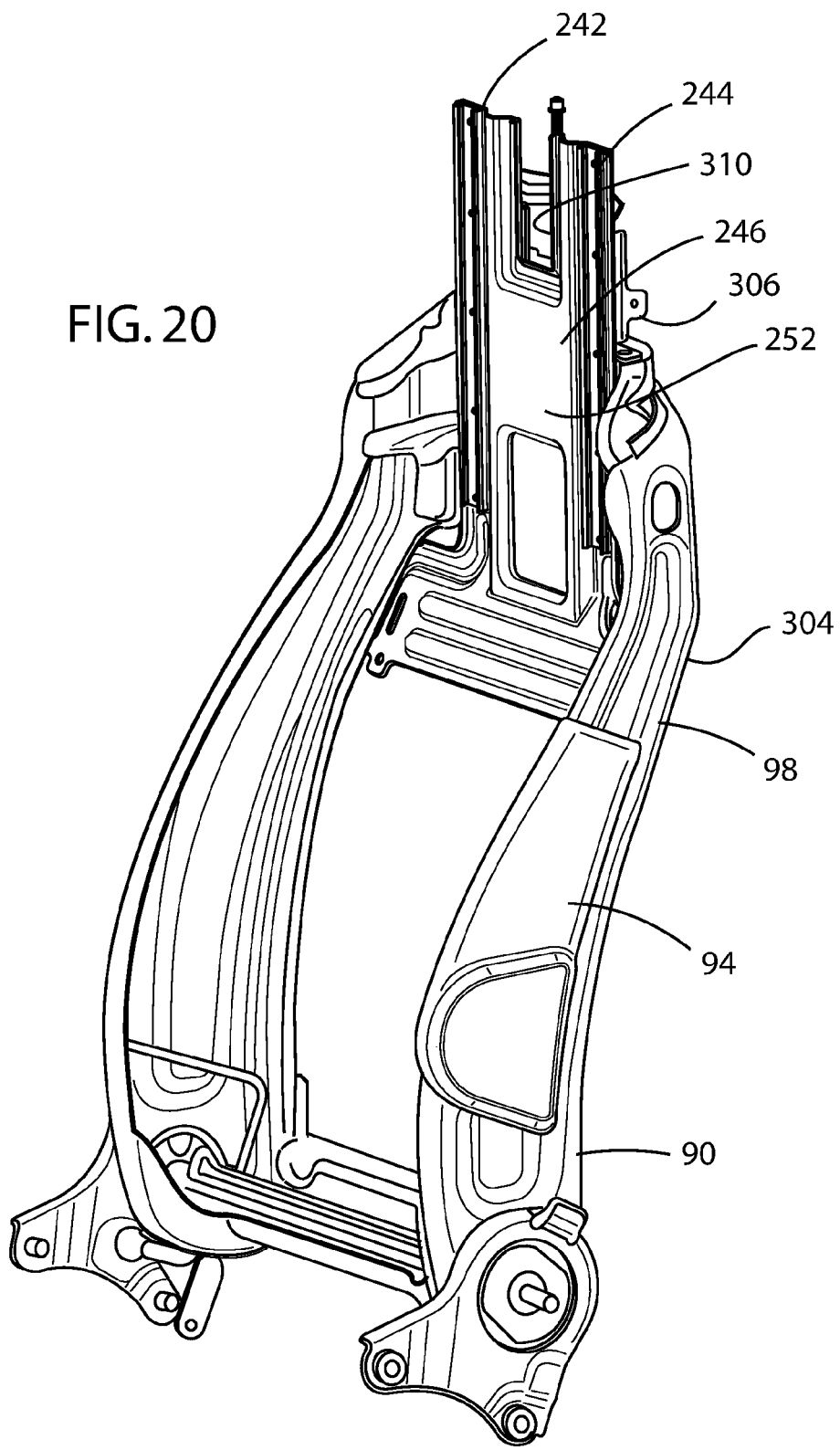
FIG. 20 is a front perspective view of the seatback frame assembly and the back frame bracket of the seatback in accordance with the present disclosure.
Figure 21:
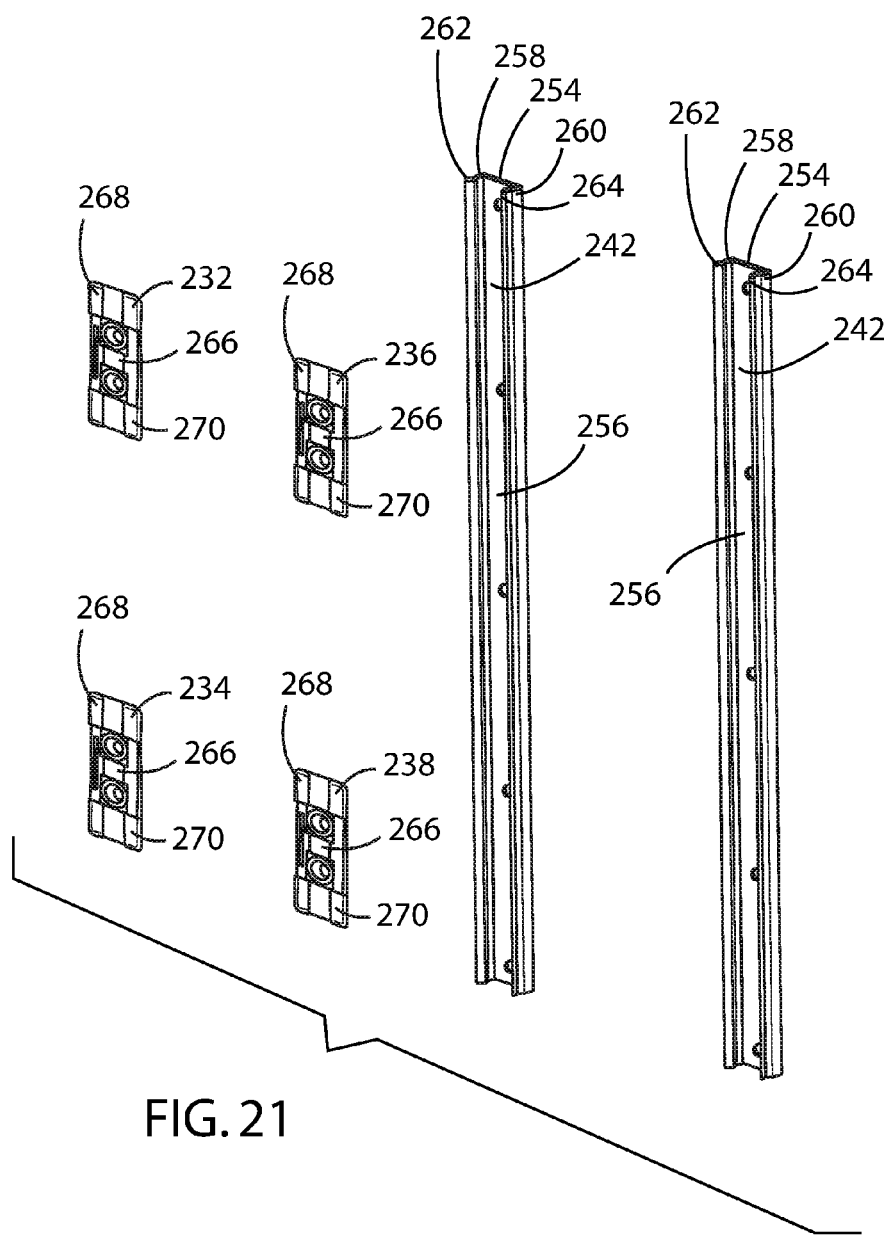
FIG. 21 is a front perspective view of the rail guides and rails of the seatback in accordance with the present disclosure.
Figure 22:
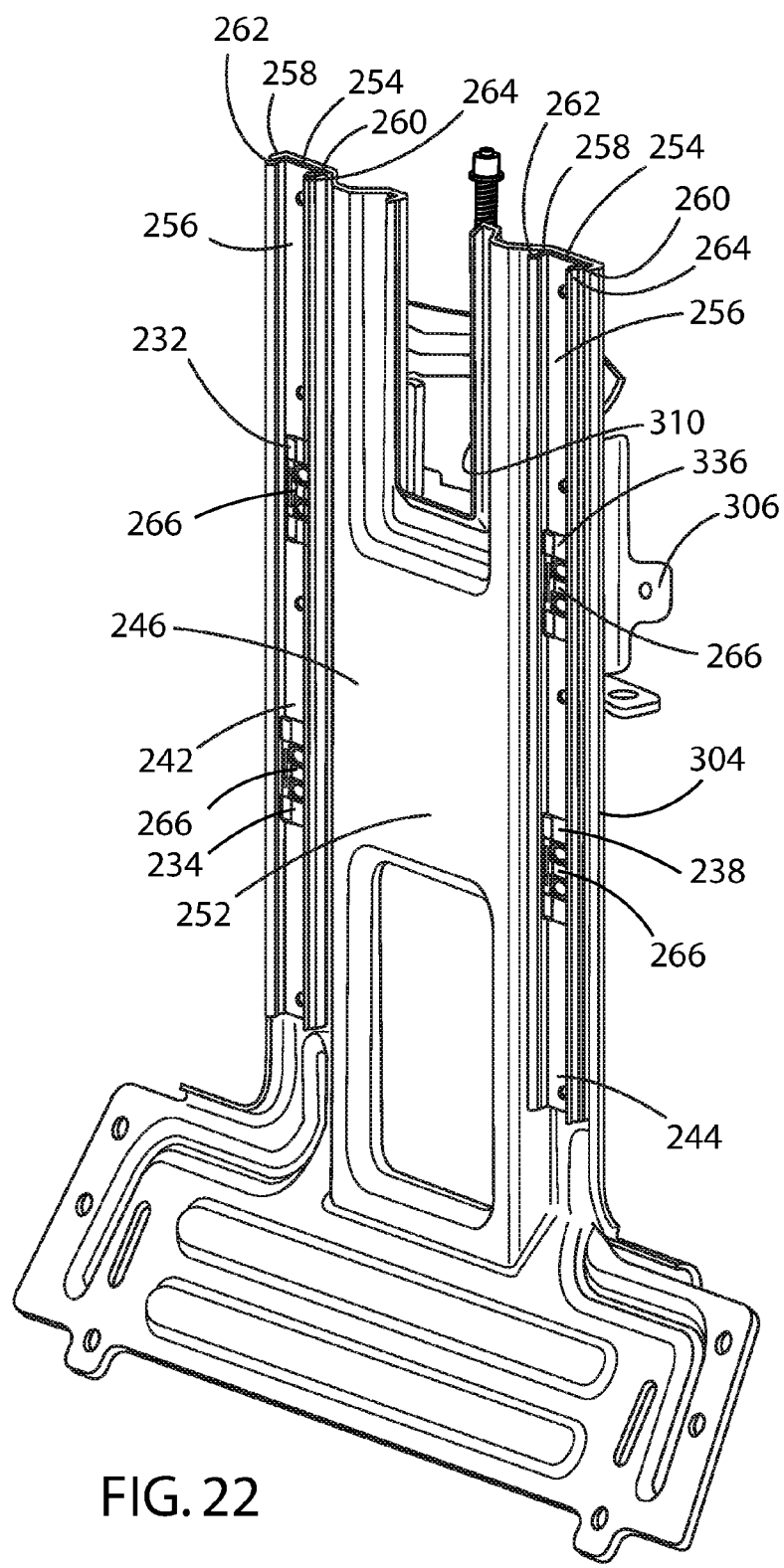
FIG. 22 is a front perspective view of the back frame bracket of the seatback in accordance with the present disclosure.

Preferably, a set of four rail guides 232, 234, 236, 238 is mounted to the rear surface 240 of the rear upper seatback slide bracket 104, as shown in FIG. 19. The rail guides 232, 234, 236, 238 are arranged in a generally rectangular orientation in two pairs on each side of the rear upper seatback slide bracket 104 about its centerline C. That is, the plurality of rail guides 232, 234, 236, 238 are mounted to the rearward facing surface 240 of the rear upper seatback slide bracket 104 in a pair of rows on the rearward facing surface 240 of the rear upper seatback slide bracket 104 and on opposite sides of and relative the centerline C thereof.

The rail guides 232, 234, 236, 238 are in turn engaged by a pair of slide rails 242, 244 mounted to a back frame bracket 246. The pair of slide rails 242, 244 is mounted in abutting relation with a forward facing surface 252 of the back frame bracket 246. Each of the slide rails 242, 244 has a base 254 in parallel relation with a forward facing surface 256 of the seatback frame assembly 90, a pair of cooperating legs 258, 260 extending orthogonally from the base 254 and a pair of opposing tabs 262, 264 extending orthogonally from the cooperating legs 258, 260 in a plane parallel to the base 254. Likewise, each of the rail guides 232, 234, 236, 238 has a base 266 in parallel relation with the rearward facing surface 240 of the rear upper seatback slide bracket 104 and a pair of ears 268, 270 extending outwardly from the base 266, the pair of ears 268, 270 being displaced from the rearward facing surface 240 of the rear upper seatback slide bracket 104 and slidingly engaged on either side by the opposing tabs 262, 264 of the slide rails 242, 244. Each of the rail guides 232, 234, 236, 238 thereby slidingly engages one of the slide rails 242, 244.

Although the preferred embodiment has been described, it should be noted that the plurality of rail guides 232, 234, 236, 238 may be mounted to either of one of the seatback frame assembly 90 or the front upper seatback slide bracket 102 and the rail may be mounted to the other of the seatback frame assembly 90 or the front upper seatback slide bracket 102, so long as the slide rails 242, 244 slidably engage the plurality of rail guides 232, 234, 236, 238.

As shown in FIGS. 7A, 7B, and 16, the lower stationary seatback base portion 98 comprises a forward facing surface 271 and a rearward facing surface 272. The forward facing surface 271 includes a lower seatback cushion 274 having an outer covering 276, while the rearward facing surface 272 comprising a semi-rigid lower back panel 278 extending upwardly relative the lower stationary seatback base portion 98. The upper movable seatback hood module 100 also includes a forward facing hood covering 280, an upper closeout panel 282 attached to a bottom portion 284 of the upper movable seatback hood module 100 beneath the forward facing hood covering 280, and the rearward-facing hood back trim panel 110.

Preferably, in order to present a pleasing appearance at all times, the upper closeout panel 282 extends downwardly behind and below an upper edge 288 of the lower seatback cushion 274 when the upper movable seatback hood module 100 is moved to an upmost raised position. Likewise, the rearward facing hood back trim panel 110 extends downwardly below an upper edge 290 of the upwardly extending lower back panel 278 when the upper movable seatback hood module 100 is moved to the upmost raised position. Also, the forward portion of the lower stationary seatback base portion 98 includes the forward facing surface 271, a back foam cushion 292, and the seatback frame assembly 90, wherein the upper closeout panel 282 extends downwardly and is vertically displaceable within a space defined between the forward facing surface 112 and back foam cushion 292 and the seatback frame assembly 90.

An electric motor drive unit 294 is mounted on one of the seatback frame assembly 90 or the rear upper seatback slide bracket 104, and is operatively coupled with the other of the seatback frame assembly 90 or the rear upper seatback slide bracket 104, as shown in FIG. 16. The electric motor drive unit 294 thus may vertically adjust the upper movable seatback hood module 100 relative the lower stationary seatback base portion 98 when the electric motor drive unit 294 is actuated.

Preferably, the electric motor drive unit 294 is mounted on the seatback frame assembly 90 and a driven member 296 is mounted on the rear upper seatback slide bracket 104, as shown in FIG. 16. The driven member 296 preferably comprises a motor nut 298, and the electric motor drive unit 294 further comprises an electric motor 300 with an output threaded shaft 302 that engages the motor nut 298 to vertically adjust the upper movable seatback hood module 100 relative the lower stationary seatback base portion 98 when the electric motor drive unit 294 is actuated.

Preferably, the electric motor 300 is mounted to a rearward facing surface 304 on back frame bracket 246, which is in turn rigidly attached to the seatback frame assembly 90 that forms the supporting structure for the lower stationary seatback base portion 98 of the seatback 14. The electric motor 300 preferably is mounted to the back frame bracket 246 via a back frame reinforcement bracket 306 and thereby engages and selectively drives the vertically extending threaded shaft 302.

An upper portion of the vertically extending threaded shaft 302 is received within a threaded opening 308 within the motor nut 298, where the motor nut 298 is in turn rigidly attached to the rearward facing surface 240 of the rear upper seatback slide bracket 104. When the electric motor 300 is actuated, the rotation of the vertically extending threaded shaft 302 drives the motor nut 298 upward or downward, depending on the initial position and direction of rotation. A slot 310 in the back frame bracket 246 allows the motor nut 298 to move upwardly and downwardly relative the back frame bracket 246. As the motor nut 298 is rigidly mounted to the rear surface 240 of the rear upper seatback slide bracket 104, the upper movable seatback hood module 100 is moved either upwardly or downwardly, again depending upon its initial position and the direction of rotation, relative the lower stationary backseat base portion 98. Thus, the interaction of the rail guides 232, 234, 236, 238 with the slide rails 242, 244 allows for the upper movable seatback hood module 100 to rise and lower relative to the lower stationary backseat base portion 98 of the seatback 14.

Figure 26:
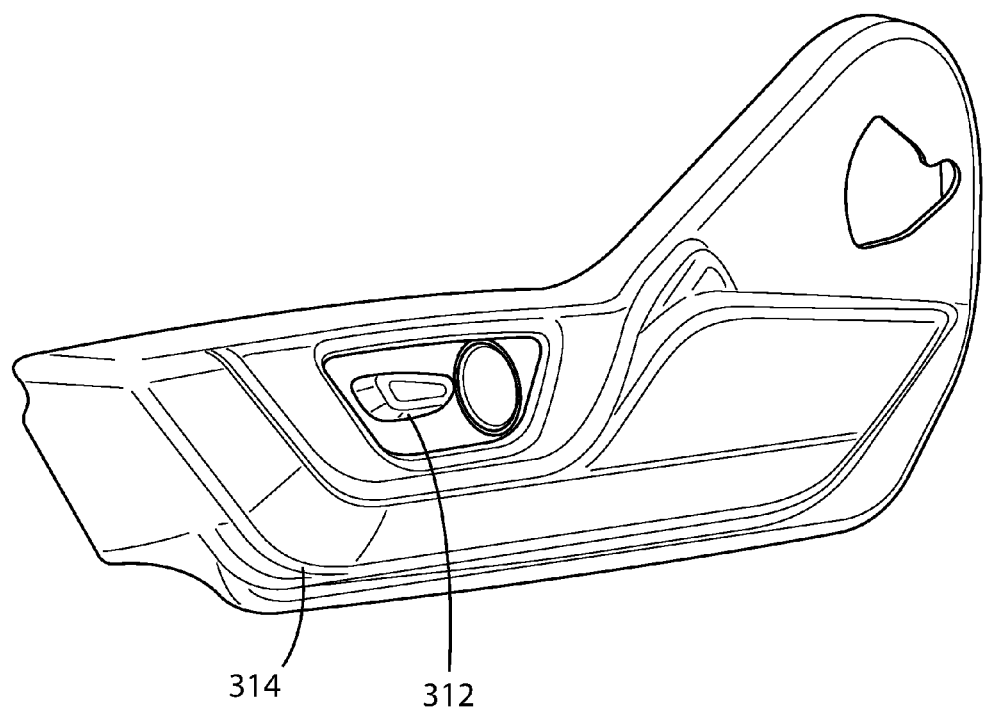
FIG. 26 is a side perspective view of the trim panel of the vehicle seating assembly in accordance with the present invention.

Although the electrical motor 300 is preferably disclosed as being mounted on the seatback frame assembly 90 and the driven member 296 is mounted on the rear upper seatback slide bracket 104, the components can be reversed. That is, the electric motor drive unit 294 may be mounted on the rear upper seatback slide bracket 104, and the driven member 296 may be mounted on the seatback frame assembly 90. A switch 312 with which to actuate the electrical motor 300 may be disposed on an outboard trim panel 314 of the seat assembly, as shown in FIG. 26.

Based on the 50$^{th}$ percentile adult male model, the upper movable seatback hood module 100 has a neutral position N, as shown in FIG. 7A, wherein the headrest 22 and the speakers 206, 208 are located at the optimum position relative the occupant's head and ears. Further, a vertical gap D is defined between a lower edge 316 of the forward facing hood covering 280 and the upper edge 288 of the lower seatback cushion 274. Preferably, the upper movable seatback hood module 100 is thus displaceable from the neutral position N to a lowermost lowered position, where the vertical height between the lowermost lowered position and the neutral position N is about 10 mm. Preferably, the upper movable seatback hood module 100 is also displaceable from the neutral position N to an upmost raised position over a vertical gap U, where the vertical height between the lower edge 316 and the upper edge 288 and thus between the upmost raised position and the neutral position N is about 65 mm. Thus, preferably, the total vertical height H between the lower edge 316 and the upper edge 288 and thus between the upmost raised position and the lowermost lowered position is about 75 mm, thereby providing a wide range of adjustment heights to accommodate occupants of different heights and builds. That is, this embodiment provides appropriate positioning of the headrest 22 and the speakers 206 relative the occupant's head and may be customized to the particular stature of the occupant. By employing the upper moveable seatback hood module 100 of the present disclosure, with a total travel of 75 mm in the vertical direction via an electric motor 300 that moves on multiple slide rails 242, 244 that allows the upper moveable seatback hood module 100, including the headrest 22, to adjust its height to the range of occupant sizes from shortest to tallest statures, the occupant's comfort is enhanced.

In accordance with another feature of the present disclosure, the headrest 22 and speakers 206 are thus placed precisely at the lower ear level of the occupant to enhance the occupant's listening experience and sense of own space. By packaging the speaker assembly 196 in the upper moveable seatback hood module 100, sound and music may be enjoyed close to the occupant's ears and within a central recess 114 of the upper moveable seatback hood module 100 assembly. The acoustics are maximized by the sound waves having short distances to travel. This proximity creates an occupant experience of "live" sounds and clear listening. Particularly in combination with the built-in resonance cavity 202 below the speaker openings 198, 200 and the dual passive radiators 224, 226 positioned at the rear and bottom of the resonance cavity 202, the headrest 22 and speakers 206 location has been found to be optimal for best listening and acoustics.

Further, the disclosed sound system provides to the occupant of the vehicle seating assembly 10 the ability to engage in private communications without using the main cabin speaker system. That is, during the use of integrated, hands-free mobile telephone conversations and vehicle systems that provide text reading capabilities during vehicle operation, the speaker assembly 196 disposed just behind the ears of the occupant allows for lower volumes and thus a more private telephone conversation or text reading experience.

Moreover, it will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the terms "coupled" in all of its forms, couple, coupling, coupled, etc. and "connected" in all of its forms, connect, connecting, connected, etc. generally means the joining of two components electrical or mechanical directly or indirectly to one another. Such joining may be stationary in nature or movable in nature. Such joining may be achieved with the two components electrical or mechanical and any additional intermediate members being integrally formed as a single unitary body with one another or with the two components. Such joining may be permanent in nature or may be removable or releasable in nature unless otherwise stated.

For purposes of this disclosure, the term "operably connected" generally means that one component functions with respect to another component, even if there are other components located between the first and second component, and the term "operable" defines a functional relationship between components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible e.g., variations in sizes, dimensions, structures, shapes and proportions of the various elements, values of parameters, mounting arrangements, use of materials, colors, orientations, etc. without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

What is claimed is:

1. A vehicle seating assembly for a motor vehicle having a lower seat and a seatback extending upwardly from the lower seat,
the seatback comprising a forward facing surface, a rearward facing surface, a headrest mounted on an upper portion of the seatback and received within a headrest cup disposed on the forward facing surface of the seatback, a speaker assembly mounted in the headrest cup, and a resonance cavity formed proximate the headrest cup within which the speaker assembly is received, the resonance cavity further comprising an upper opening that opens into the headrest cup disposed on a lower portion of the headrest cup, the upper opening receiving the speaker assembly, and a passive radiator disposed on a rearward side of the resonance cavity.

2. The vehicle seating assembly of claim 1, wherein the upper opening comprises a pair of speaker openings arranged in side-by-side relation on the lower portion of the headrest cup and the speaker assembly comprises a pair of speakers each received within one of the pair of speaker openings.

3. The vehicle seating assembly of claim 2, wherein a headrest cup speaker grill is disposed above the speaker openings and below the headrest, and a forward facing gap is provided between the headrest cup speaker grill and a lower portion of the headrest.

4. The vehicle seating assembly of claim 3, wherein the headrest cup speaker grill is comprised of a thin gauge perforated metal mesh.

5. The vehicle seating assembly of claim 4, wherein the perforated metal mesh is comprised of aluminum mesh having a thickness of 0.005 inch.

6. The vehicle seating assembly of claim 1, wherein the resonance cavity further comprises a rearward facing opening in which the passive radiator disposed on a rearward side of the resonance cavity is received.

7. The vehicle seating assembly of claim 6, wherein the upper opening comprises a pair of speaker openings arranged in side-by-side relation on the lower portion of the headrest cup and the speaker assembly comprises a pair of speakers each received within one of the pair of speaker openings, and the rearward facing opening comprises a pair of passive radiator openings arranged in side-by-side relation within which each one of a pair of the passive radiators is received.

8. The vehicle seating assembly of claim 7, wherein each of the pair of passive radiators comprise a circular elastomeric diaphragm.

9. The vehicle seating assembly of claim 1, wherein the resonance cavity is completely enclosed.

10. The vehicle seating assembly of claim 1, further comprising a forward facing gap between the speaker assembly and a lower portion of the headrest.

11. The vehicle seating assembly of claim 1, wherein the headrest cup is formed as a polymeric shell mounted within and on the forward facing surface of the seatback and the headrest is removably mounted within the headrest cup.

12. A seatback for a motor vehicle comprising a forward facing surface, a rearward facing surface, a headrest disposed on an upper portion of the seatback and received within a headrest cup formed on the forward facing surface of the seatback, a speaker assembly mounted in the headrest cup, and a resonance cavity formed proximate the headrest cup within which the speaker assembly is received.

13. The seatback of claim 12, wherein a forward facing gap is provided between the speaker assembly and a lower portion of the headrest.

14. The seatback of claim 13, wherein the resonance cavity is enclosed and comprises a pair of speaker openings arranged in side-by-side relation on the lower portion of the headrest cup and the speaker assembly comprises a pair of speakers each received within one of the pair of speaker openings, the resonance cavity further comprising a pair of passive radiator openings arranged in side-by-side relation within which each one of a pair of the passive radiators is received.

15. The seatback of claim 14, wherein each of the pair of passive radiators comprise a circular elastomeric diaphragm.

16. The vehicle seating assembly of claim 1, wherein a headrest cup speaker grill comprised of a thin gauge perforated metal mesh is disposed above the speaker opening and below the headrest.

17. A vehicle seating assembly for a motor vehicle having a lower seat and a seatback extending upwardly from the lower seat,
the seatback comprising a forward facing surface, a rearward facing surface, a headrest mounted on an upper portion of the seatback and received within a headrest cup disposed on the forward facing surface of the seatback, a pair of speakers mounted in the headrest cup, and a resonance cavity formed proximate the headrest cup within which the pair of speakers is received, the resonance cavity forming an enclosed volume and comprising a pair of speaker openings arranged in side-by-side relation on a lower portion of the headrest cup, wherein one each of the pair of speakers is received within one of the pair of speaker openings, the resonance cavity further comprising a pair of rearward facing passive radiator openings arranged in side-by-side relation within which each receive one of a pair of passive radiators.

18. The vehicle seating assembly of claim 1, wherein the headrest cup is formed as a polymeric shell mounted within and on the forward facing surface of the seatback and the headrest is removably mounted within the headrest cup.

19. The vehicle seating assembly of claim 17, wherein a forward facing gap is provided between the speaker openings and a lower portion of the headrest.

\* \* \* \* \*